United States Patent [19]

Miyazawa

[11] Patent Number: 5,781,260
[45] Date of Patent: Jul. 14, 1998

[54] LIQUID CRYSTAL DISPLAY DEVICE HAVING LIGHT SHADING FILM

[75] Inventor: Yoshinaga Miyazawa, Hino, Japan

[73] Assignee: Casio Computer Co., Ltd., Tokyo, Japan

[21] Appl. No.: 531,731

[22] Filed: Sep. 21, 1995

[30] Foreign Application Priority Data

Sep. 30, 1994 [JP] Japan .................. 6-259817

[51] Int. Cl.[6] .............. G02F 1/1333; G02F 1/136; G02F 1/1343
[52] U.S. Cl. ............ 349/111; 349/44; 349/128; 349/139
[58] Field of Search ............... 359/59, 67, 75; 349/44, 110, 128, 139, 14

[56] References Cited

U.S. PATENT DOCUMENTS

| | | | |
|---|---|---|---|
| 5,149,771 | 9/1992 | Murata et al. | 359/75 |
| 5,215,677 | 6/1993 | Narita et al. | 359/75 |
| 5,416,619 | 5/1995 | Koike | 359/59 |
| 5,434,688 | 7/1995 | Saitoh et al. | 359/67 |
| 5,459,596 | 10/1995 | Ueda et al. | 359/67 |
| 5,499,123 | 3/1996 | Mikoshiba | 359/67 |
| 5,510,916 | 4/1996 | Takahashi | 359/67 |

*Primary Examiner*—William L. Sikes
*Assistant Examiner*—Toan Ton
*Attorney, Agent, or Firm*—Frishauf, Holtz, Goodman, Langer & Chick

[57] ABSTRACT

On one of a pair of substrates sandwiching a liquid crystal, a pair of signal lines, a pair of scanning lines intersecting these signal lines at right angles, a picture element electrode arranged in the region surrounded by the signal lines and the scanning lines, and a first alignment layer on which alignment treatment is applied in a first alignment direction, are formed. On the other of the substrates, a counter electrode, and a second alignment layer on which alignment treatment is applied in a second alignment direction, are formed. The alignment treatments on the first and second alignment layers are mutually carried out so that the side of the picture element electrode at which an optical leakage caused by disclination of a liquid crystal appears largest is near one of the pair of signal lines. On one of the pair of substrates, a light shading film is formed to be partially overlapped with one or more sides of the picture element electrode containing at least one side at which an optical leakage appears largest. The width of light shading film overlapped with the side of the picture element electrode at which the optical leakage appears smaller, can be set smaller to improve the aperture ratio.

11 Claims, 23 Drawing Sheets

5,781,260

1

LIQUID CRYSTAL DISPLAY DEVICE HAVING LIGHT SHADING FILM

BACKGROUND OF THE INVENTION

1. Field of the Invention

The present invention relates to an active-matrix type liquid crystal display device having a light shading film.

2. Description of Related Art

Matrix type liquid crystal display devices include active-matrix-addressed twisted nematic liquid crystal display devices (hereinafter referred to as TN-LCDs), as shown in FIG. 22. The TN-LCD has a liquid crystal cell 3 which is disposed between two polarizers 1 and 2. The liquid crystal cell 3 comprises a lower substrate 4 and an upper substrate 5, which are made of glass or the like and which are opposed to each other, and a liquid crystal layer 6. The liquid crystal layer 6 comprises a continuously 90° twisted nematic liquid crystal. A plurality of picture element electrodes 7 are arranged in matrix form on the upper surface of the lower substrate 4, and a lower alignment layer 8 is provided thereon. A plurality of scanning lines, i.e., gate lines (not shown), and a plurality of signal lines, i.e., drain lines 9, are arranged in the upper side on the lower substrate 4. A thin film transistor (TFT) which is also not shown, is provided in the vicinity of each of intersections of the scanning lines and the signal lines. Each of the TFTs is a switching element which is connected to a picture element electrode 7 and to a scanning line and a signal line 9. A common electrode (a counter electrode) 10 is provided on the lower surface of the upper substrate 5 and an upper alignment layer 11 is provided on the lower surface thereof.

When a voltage signal corresponding to picture data is input to a signal line 9 on a column while all TFTs connected to a scanning line on a row are in an ON state as set by a scanning signal being input to the scanning line, a voltage is applied to a picture element electrode 7 through a TFT which is in the ON state, from the signal line 9. As a result, a voltage is applied to the liquid crystal layer 6 between the voltage-applied picture element electrode 7 and the common electrode 10, so that orientation of the liquid crystal molecules to which the voltage is applied, is changed. An optical change caused by the change of the orientation is visualized by the polarizers 1 and 2. Consequently, a desired display, e.g., a black and white display, is obtained.

Deterioration of display quality as a result of the occurrence of disclination is a serious problem in such a TN-LCD and, in particular, in a high-information-content display having numerous picture element electrodes 7. That is, in a TN-LCD having a normally white mode, when a voltage of about 6V is applied to the picture element electrodes 7, for example, in a picture element portion 12 shown in FIG. 22, the left side of a dotted line 12a comes to a normal display containing a region 12b of the normal tilt domain which has the same tilt direction of liquid crystal molecules as the pretilt direction thereof. The right side of the dotted line 12a comes to an abnormal display containing a region 12c of the reverse tilt domain which causes an optical leakage to form a void. The dotted line 12a illustrated therebetween shows a disclination line which is a boundary between the region 12b of the normal tilt domain and the region 12c of the reverse tilt domain. A plan view of this one picture element portion 12 is shown in FIG. 23. In this figure, the region illustrated by oblique lines is the abnormal display containing the region 12c of the reverse tilt domain which causes the optical leakage to form a void. When such a void is formed in a portion of the picture element portion 12, the contrast of

2 the entirety of the TN-LCD is sharply lowered, so that the display quality thereof is extremely deteriorated.

The occurrence position of such a disclination will be explained as follows. Disclination occurs at positions at which lines in pretilt directions depending upon alignment directions such as rubbing directions, of the lower and upper alignment layers 8 and 11, i.e., tilt angles of long axes of the liquid crystal molecules on both interfaces between the liquid crystal layer 6 and the lower and upper alignment layers 8 and 11, and lines in directions of lateral electric fields generated between the picture element electrode 7 and the scanning line and between the picture element electrode 7 and the signal line 9, cross at right angles. The reason for this is that because the director of a liquid crystal molecule having positive electric anisotropy, i.e., a unit vector in the direction in which the long axis of the liquid crystal molecule is oriented with priority, is oriented along the direction of a localized electric field, directors in right and left sides of the boundary which is formed by the positions at which lines in the pretilt directions and lines in directions of lateral electric fields cross at right angles, are oriented with reverse tilt angles with respect to each other.

Such a disclination is apt to occur in very small-sized picture elements with a small pitch, in an alignment layer which gives a small pretilt angle to the liquid crystal molecules on the interface between the liquid crystal layer and the alignment layer, during a drive at a high temperature because of a pretilt angle smaller than that of a drive at room temperature, and during occurrence of a strong lateral electric field. In particular, the smaller the pitch of the picture elements is, the smaller relative area ratio of the normal display region 12b to the picture element portion 12 becomes. Consequently, the contrast of the display is extremely lowered. When the pretilt angle is small, the reverse tilt phenomenon is apt to occur, and the positions at which lines in pretilt directions and lines in directions of lateral electric fields cross at right angles, i.e., the occurrence positions of disclination move to inner side in the picture element portion 12. Therefore, the disclination is apt to occur in a TN-LCD which has very small-sized picture elements and in which a high temperature drive is required, e.g., in a device for use in a vehicle such as a car or the like, or in a device for use as a projector, or the like. Conventionally, because each edge of the openings of the light shading films is set on a line which is an equal distance of the maximum transmission distance of disclination, e.g., about twice the gap between the alignment layers 8 and 11 (the cell gap), apart from the adjacent scanning line or the adjacent signal line 9, in order to reduce such a disclination, there has been a problem in that the aperture ratio thereof is extremly lowered.

SUMMARY OF THE INVENTION

The present invention has been developed in view of the above-described problems. An object of the present invention is to provide a liquid crystal display device which can minimize the optical leakage due to disclinations without reduction of the aperture ratio.

According to the present invention, it is possible a liquid crystal display device comprises: a first substrate; a second substrate; a picture element electrode formed on the first substrate in the side of the surface opposed to the second substrate; a pair of signal lines and a pair of scanning lines, which are arranged predetermined spaces apart from the peripheral edges of the picture element electrode; a first alignment layer on which an alignment treatment is applied in a first alignment direction and which covers the picture element electrode, the signal lines and the scanning lines; a counter electrode formed on the second substrate in the side of the surface opposed to the first substrate; a second alignment layer on which an alignment treatment is applied in a second alignment direction which is different from that of the first alignment layer, and which covers the counter electrode; a liquid crystal disposed between the first and second alignment layers; and a light shading film formed on the first substrate or the second substrate along the signal lines or the scanning lines, wherein the light shading film has an opening with a size smaller than that of the picture element electrode, and the edge of the opening is situated inside the edge of the picture element electrode, and the distance between the edge of the opening and the signal line or the scanning line, in the side corresponding to a side of the picture element electrode at which an optical leakage caused by disclination of the liquid crystal appears larger, is larger than that of the side corresponding to a side of the picture element electrode at which an optical leakage caused by disclination of the liquid crystal appears smaller.

PREFERRED EMBODIMENT OF THE INVENTION

Figure 1:
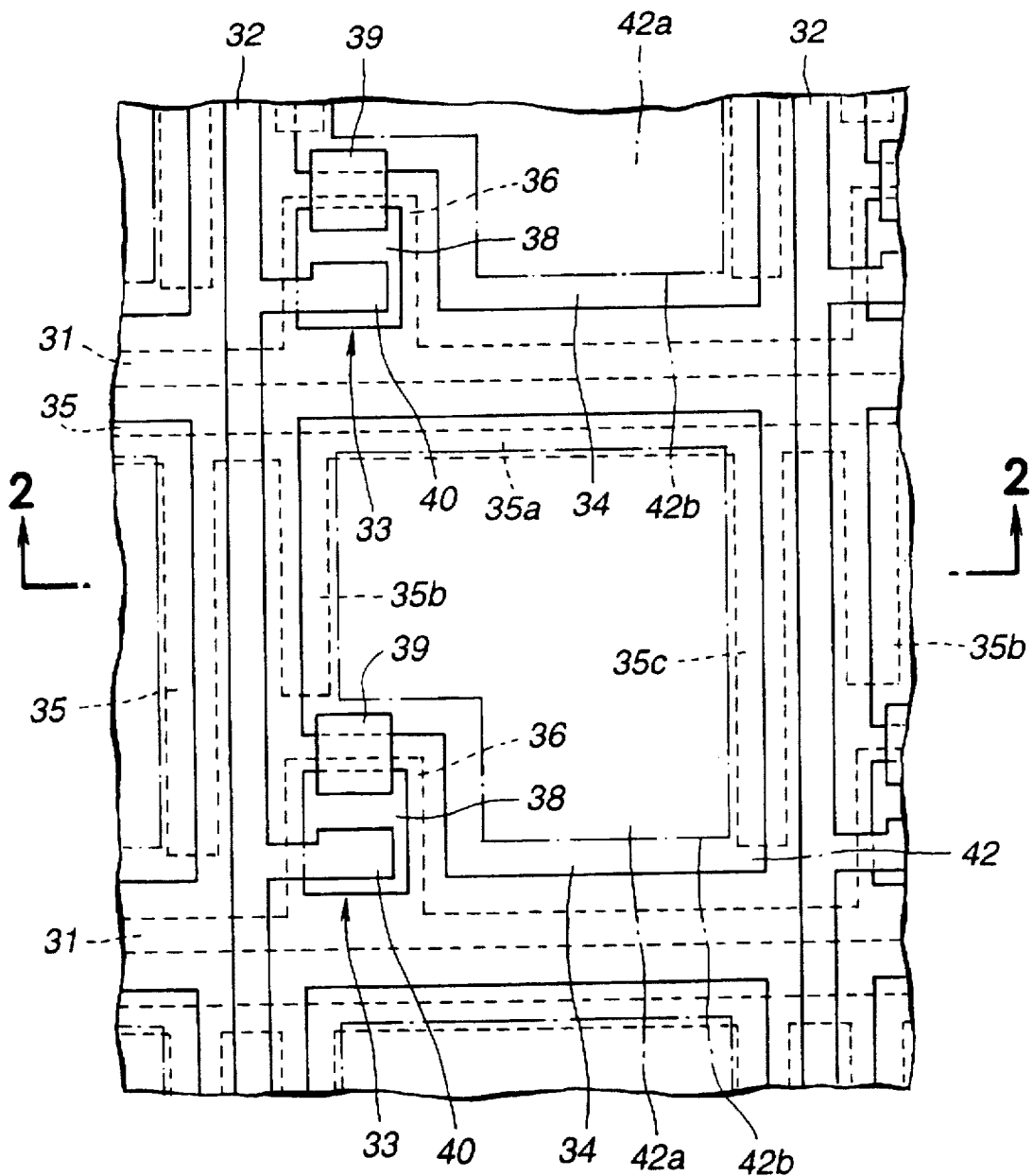
FIG. 1 is a plan view showing the principal part of an active-matrix type liquid crystal display device according to an embodiment of the present invention.
Figure 2:
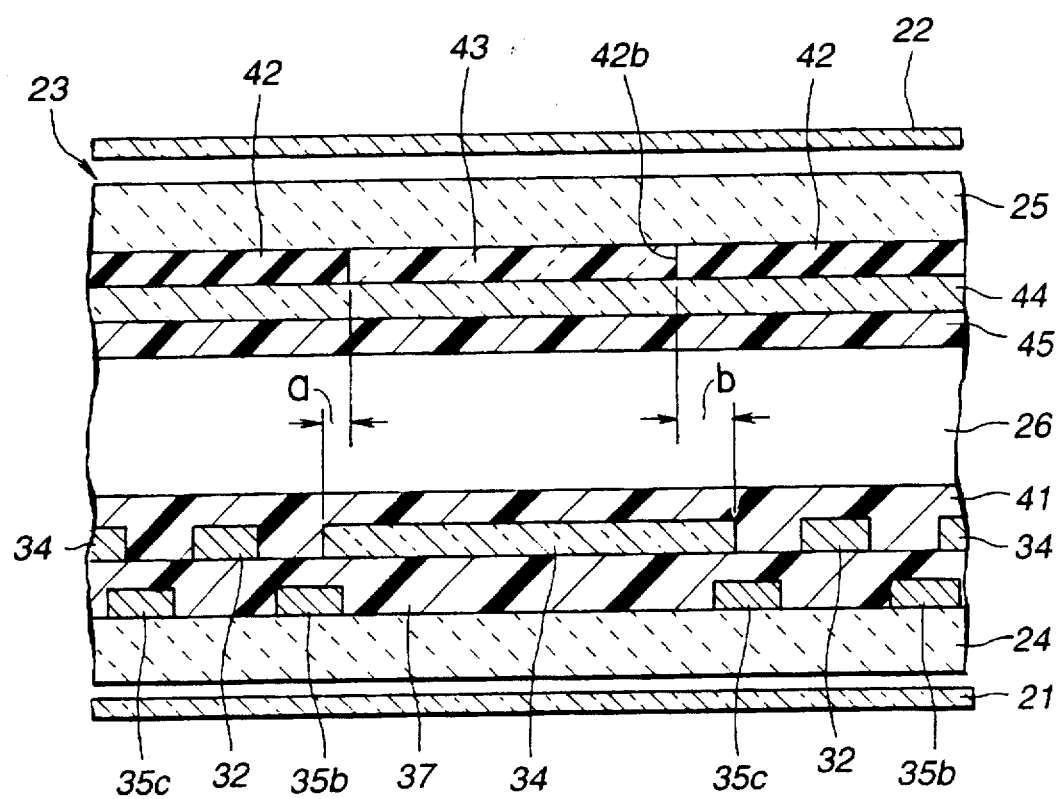
FIG. 2 is a cross-sectional view taken on line 2—2 of FIG. 1.

FIGS. 1 and 2 show the principal part of the matrix type liquid crystal display device according to an embodiment of the present invention. FIG. 1 is a plan view showing the lower substrate 24 in FIG. 2, in which the lower alignment layer 41 is omitted. The matrix type liquid crystal display device is a transmission type of an active-matrix-addressed twisted nematic liquid crystal display device (hereinafter referred to TN-LCD). The TN-LCD has a liquid crystal cell 23 disposed between a pair of polarizers 21 and 22. The liquid crystal cell 23 comprises a lower substrate 24 and an upper substrate 25 which are made of glass or the like and are opposed to each other, liquid crystal 26, and the like. The liquid crystal 26 comprises a continuously 90° twisted nematic liquid crystal.

On the upper surface of the lower substrate 24, a plurality of scanning lines (gate lines) 31 and a plurality of signal lines (drain lines) 32 intersecting the scanning lines 31, are provided. In the vicinity of each intersection thereof, a thin film transistor 33 as a switching element, a picture element electrode 34, and an electrode 35 for a shield type of storage capacitor are provided. Hereinafter, the shield type, to be described in detail later, means a type having a function for alleviating a lateral field. The scanning lines 31 including gate electrodes 36 are formed at predetermined positions on the upper surface of the lower substrate 24. Opaque electrodes 35 for storage capacitors are formed at other predetermined positions on the upper surface of the lower substrate 24. On the whole upper surface thereof, a gate insulating film 37 is formed. At predetermined positions on the upper surface of the gate insulating film 37, semiconductor thin films 38 made of amorphous silicon, polysilicon, or the like, are formed. On the upper surface in the vicinity of both ends of each semiconductor thin film 38, a source electrode 39 and a drain electrode 40 are formed. These source electrodes 39 and drain electrodes 40, and the signal lines 32, are formed at the same time. At predetermined positions on the upper surface of the gate insulating film 37, transparent picture element electrodes 34 each of which is connected to one of the source electrode 39, are formed. The lower alignment layer 41 is formed on the whole upper surface thereof.

On the other hand, a light shading film 42 is provided at predetermined positions on the lower surface of the upper substrate 25. On the rest of the lower surface of the upper substrate, i.e., in openings 42a of the light shading film 42, red (R), green (G), and blue (B) color filters 43 are formed. On the lower surface of the color filters 43 and of the light shading film 42, a common electrode (a counter electrode) 44 is formed. On the lower surface of the common electrode 44, an upper alignment layer 45 is formed. Alternate long and short dash lines 42b shown in FIG. 1 illustrate edges of the openings 42a of the light shading film 42.

Next, the position relationship between the picture element electrode 34, the electrode 35 for the storage capacitor, and the opening 42a of the light shading film 42 will be explained.

The electrode 35 for the storage capacitor comprises a common linear portion 35a which is arranged at the position corresponding to the upper edge of the picture element electrode 34 and is parallel to the scanning line 31, a left drawn portion 35b which is drawn from the common linear portion 35a along the left edge of the picture element electrode 34, and a right drawn portion 35c which is drawn from the common linear portion 35a along the right edge of the picture element electrode 34. The common linear portion 35a is arranged inside the upper edge of the picture element electrode 34, and is overlapped with the upper edge portion of the picture element electrode 34 in a plan view. The right side portion of the left drawn portion 35b is overlapped with the left edge portion of the picture element electrode 34 in the plan view. The left side portion of the right drawn portion 35c is overlapped with the right edge portion of the picture element electrode 34 in the plan view. Such overlapped portions of the electrode 35 for the storage capacitor and the picture element electrode 34 form an auxiliary capacitance portion. The upper edge of each opening 42a of the light shading film 42 is disposed inside the picture element electrode 34 and also inside the common linear portion 35a of the electrode 35 for the storage capacitor. The left edge of the opening 42a is disposed inside the left side of the picture element electrode 34 and outside the left drawn portion 35b of the electrode 35 for the storage capacitor. The right edge of the opening 42a is disposed inside the right side the picture element electrode 34 and outside the right drawn portion 35c of the electrode 35 for the storage capacitor.

The position relationship between the picture element electrode 34 and the opening 42a of the light shading film 42 will be concretely explained.

Figure 3:
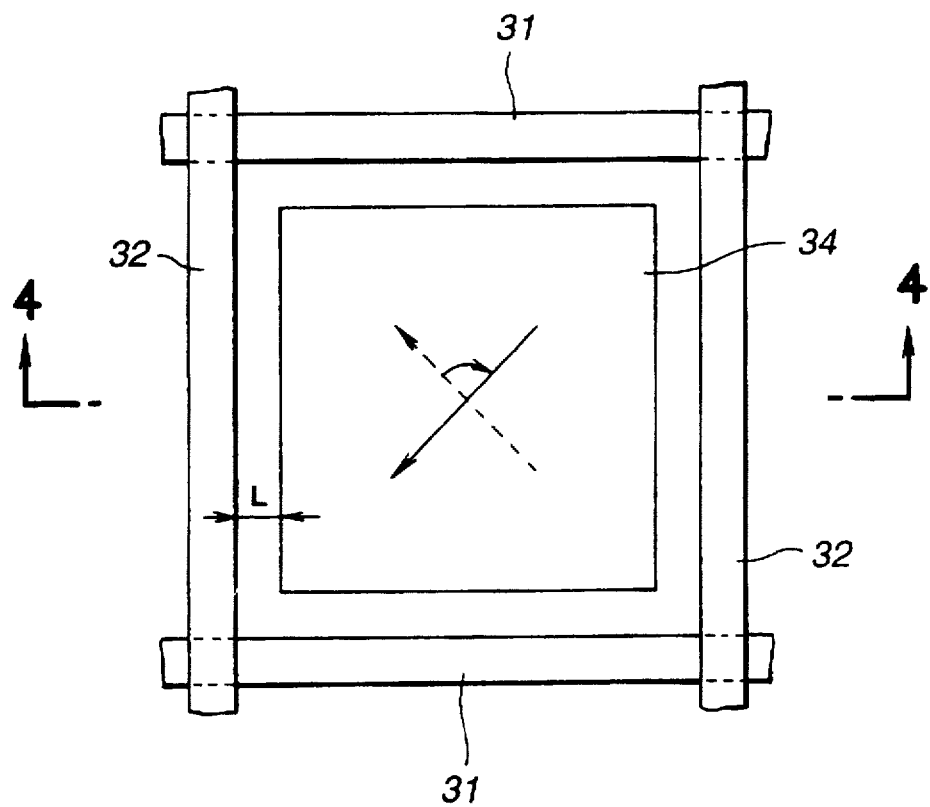
FIG. 3 is a schematic plan view showing a picture element electrode and surrounding scanning and signal lines partially.
Figure 4:
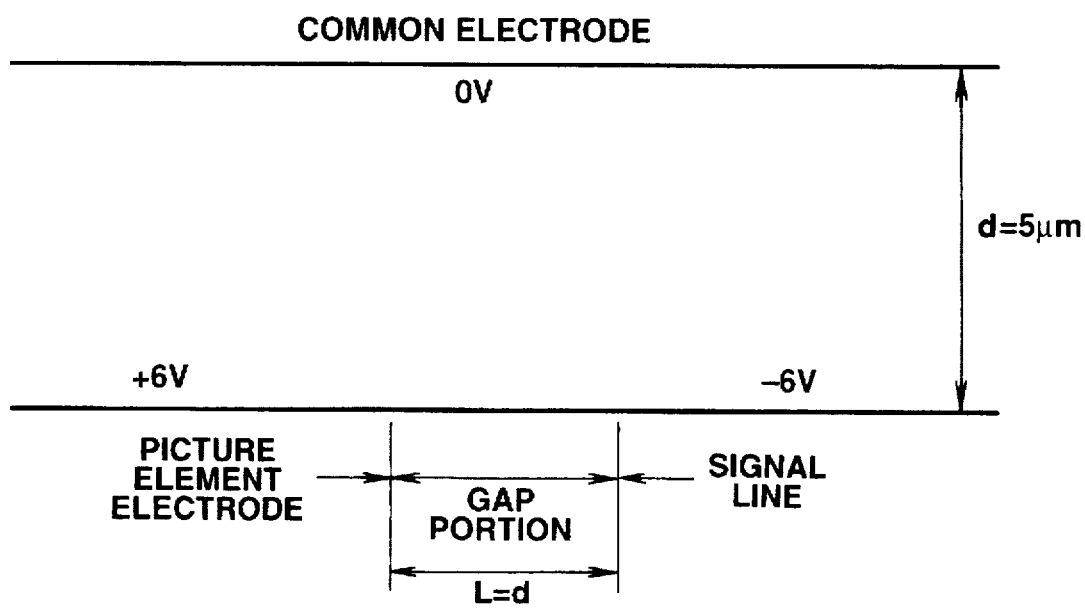
FIG. 4 is a view illustrating the position relationship between these electrodes in a cross-section taken on line 4—4 of FIG. 3.

First, the relationship between directions of alignment treatments of the alignment layers 41 and 45 and occurrence position of disclination will be explained. FIG. 3 is a schematic plan view of one picture element electrode 34, scanning lines 31 adjacent thereto, and signal lines 32. She width of the gap portions between the picture element electrode 34 and the scanning lines 31 and between the picture element electrode 34 and the signal lines 32 (hereinafter, referred to gap portions simply) are uniformly set to L. The alignment treatment on the lower alignment layer 41 is carried out in a direction toward the upper left, as illustrated by a dotted line with an arrow in FIG. 3, and the alignment treatment on the upper alignment layer 45 is carried out in a direction toward the lower left, as illustrated by a solid line with an arrow in this figure. FIG. 4 is a view illustrating the position. relationship between the above electrodes in a cross-section taken on line 4—4 of FIG. 3. In FIG. 4, the gap d between the alignment layers 41 and 45, i.e., the cell gap, is set to d=5 µm, the width L of the above gap portion is set to d, and the pretilt angle $\Theta e$, which is not shown in this figure, is set to 3°.

Then, voltages of +6V, −6V, 0V, and 0V were applied to the picture element electrode 34, the signal line 32 which was on the right of the picture element electrode 34, the common electrode 44, and the electrode 35 for the storage capacitor, respectively. The alignment vector and equipotential curves, of liquid crystal 26 were studied, so that the results shown in FIG. 5A was obtained. The alignment vector and the Y-value (a Y-value transmission curve), of liquid crystal 26 were studied, so that the results shown in FIG. 5B was obtained.

Figure 5A:
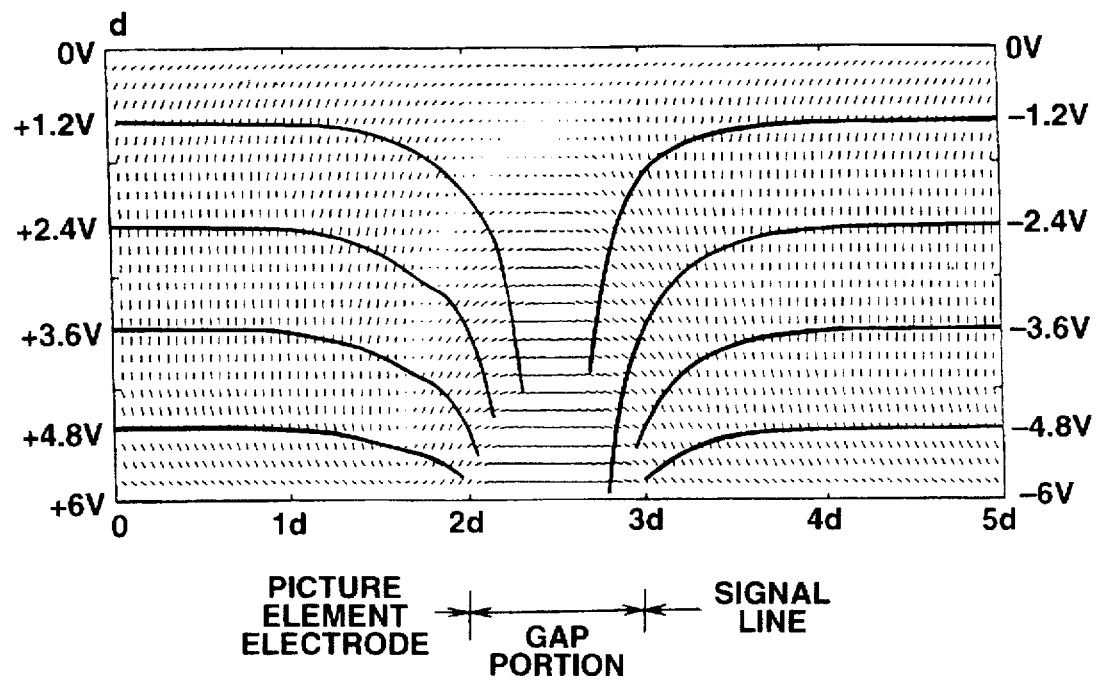
FIG. 5A is a view in which alignment vector and an equipotential curve, of liquid crystal in an alignment condition shown in FIG. 3, are overlapped.

According to FIG. 5A, it is understood that the electric lines of force are generated in directions perpendicular to respective equipotential curves and run on concentric circles around the center of the gap portion; and that a reverse tilt is occurred at a position of an unnatural tilt direction depending on the electric lines of force of the lateral field which direct from the picture element electrode 34 to the signal line 32 and on alignment forces by the alignment layers 41 and 45, that is, in the left side of the gap portion, and a disclination is occurred in the left side of the gap portion. According to FIG. 5B, it is understood that a peak of optical leakage according to the disclination is formed in the left side of the gap portion, the transmission distance of optical leakage in the side of the peak is about 0.5d and the Y-value at the peak is about 12. On the other hand, the transmission distance of optical leakage in the side opposite to the peak is about 0.3d and the Y-value at the edge of the signal line is about 10. The transmission distance of optical leakage is the ratio of the distance ▌ x of the position. at which the Y-value of optical leakage has a brightness of 10 times that in the complete dark condition, from the edge of the picture element electrode 34, to the distance L (=d) of the gap portion.

Figure 6:
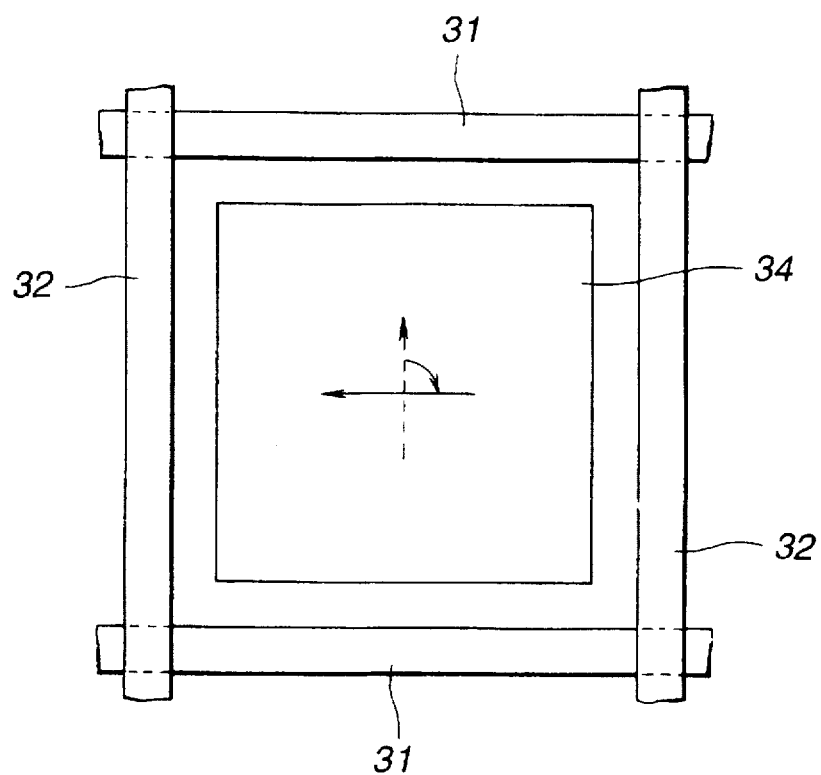
FIG. 6 is a schematic plan view showing an alignment condition when the alignment condition shown in FIG. 3 is rotated by 45° in a clockwise direction.
Figure 7A:
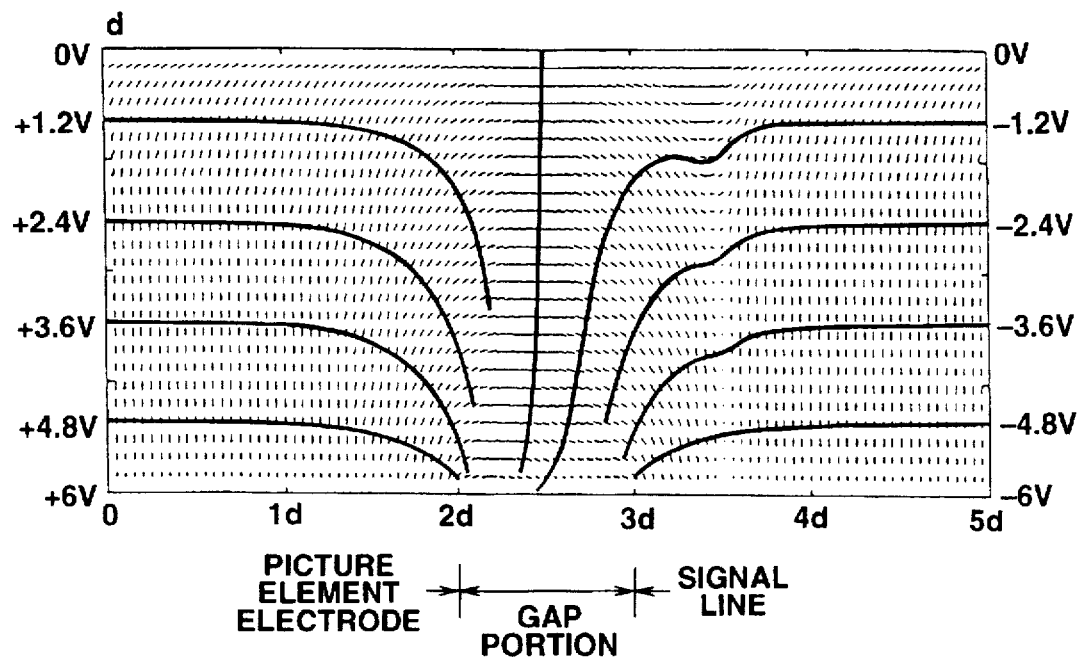
FIG. 7A is a view in which alignment vector and an equipotential curve, of liquid crystal in an alignment condition shown in FIG. 6, are overlapped.

An alignment condition obtained when the one shown in FIG. 3 is rotated by 45° in a clockwise direction, is shown in FIG. 6. The alignment treatment on the lower alignment layer 41 was carried out in a direction toward the upper, as illustrated by a dotted line with an arrow in FIG. 6, and the alignment treatment on the upper alignment layer 45 was carried out in a direction toward the left, as illustrated by a solid line with an arrow in this figure. Other conditions were the same as the case of using the alignment condition shown in FIG. 3, so that the results shown in FIGS. 7A and 7B were obtained. According to FIG. 7B, it is understood that a peak of optical leakage according to the disclination is formed in the right side of the gap portion, the transmission distance of optical leakage in the side of the peak is about 0.7d and the Y-value at the peak is about 25. On the other hand, the transmission distance of optical leakage in the side opposite to the peak is about 0.3d and the Y-value is about 0.

Figure 8:
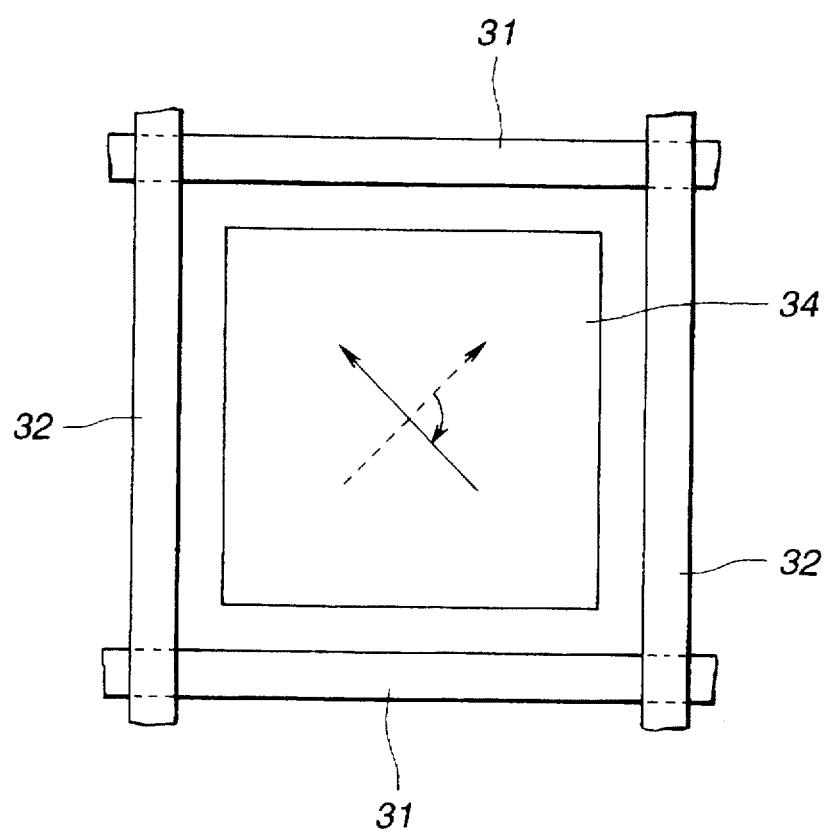
FIG. 8 is a schematic plan view showing an alignment condition when the alignment condition shown in FIG. 6 is rotated by 45° in a clockwise direction.
Figure 9A:
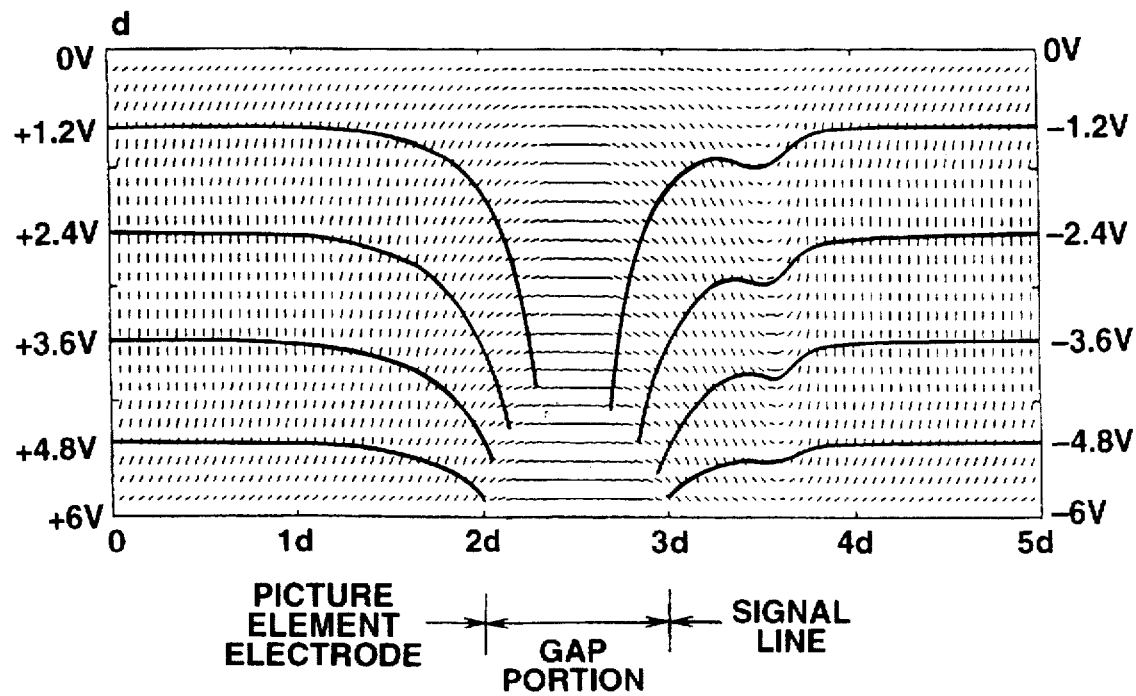
FIG. 9A is a view in which alignment vector and an equipotential curve, of liquid crystal in an alignment condition shown in FIG. 8, are overlapped.

An alignment condition obtained when the one shown in FIG. 6 is rotated by 45° in a clockwise direction, is shown in FIG. 8. The alignment treatment on the lower alignment layer 41 was carried out in a direction toward the upper right, as illustrated by a dotted line with an arrow in FIG. 8, and the alignment treatment on the upper alignment layer 45 was carried out in a direction toward the upper left, as illustrated by a solid line with an arrow in this figure. Other conditions were the same as the case of using the alignment condition shown in FIG. 3, so that the results shown in FIGS. 9A and 9B were obtained. According to FIG. 9B, it is understood that a peak of optical leakage according to the disclination is formed in the right side of the gap portion, the transmission distance of optical leakage in the side of the peak is about 0.8d and the Y-value at the peak is about 28. On the other hand, the transmission distance of optical leakage in the side opposite to the peak is about 0.6d and the Y-value is about 28.

Figure 10:
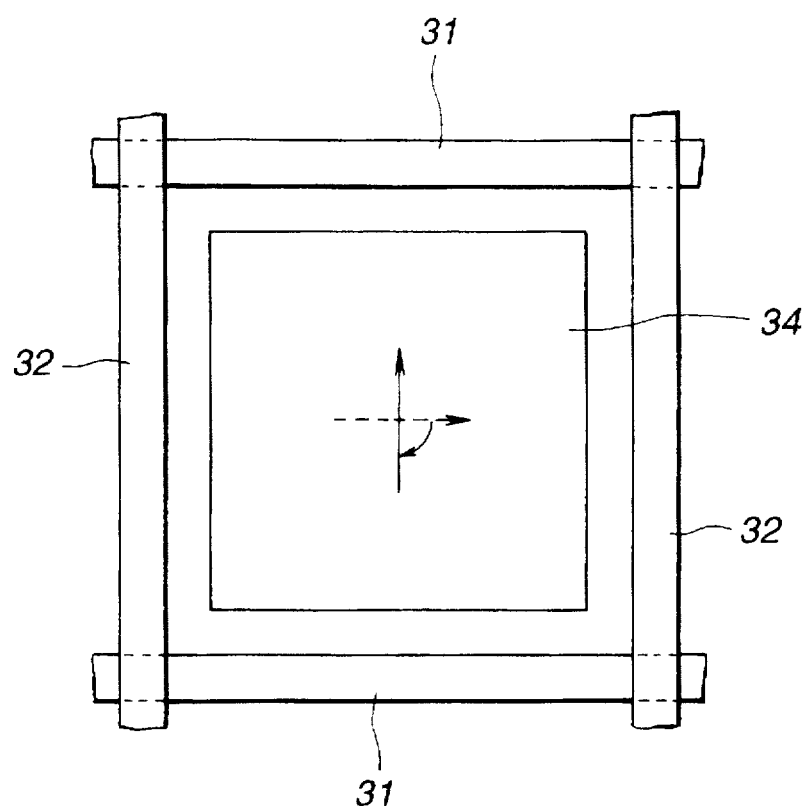
FIG. 10 is a schematic plan view showing an alignment condition when the alignment condition shown in FIG. 8 is rotated by 45° in a clockwise direction.
Figure 11A:
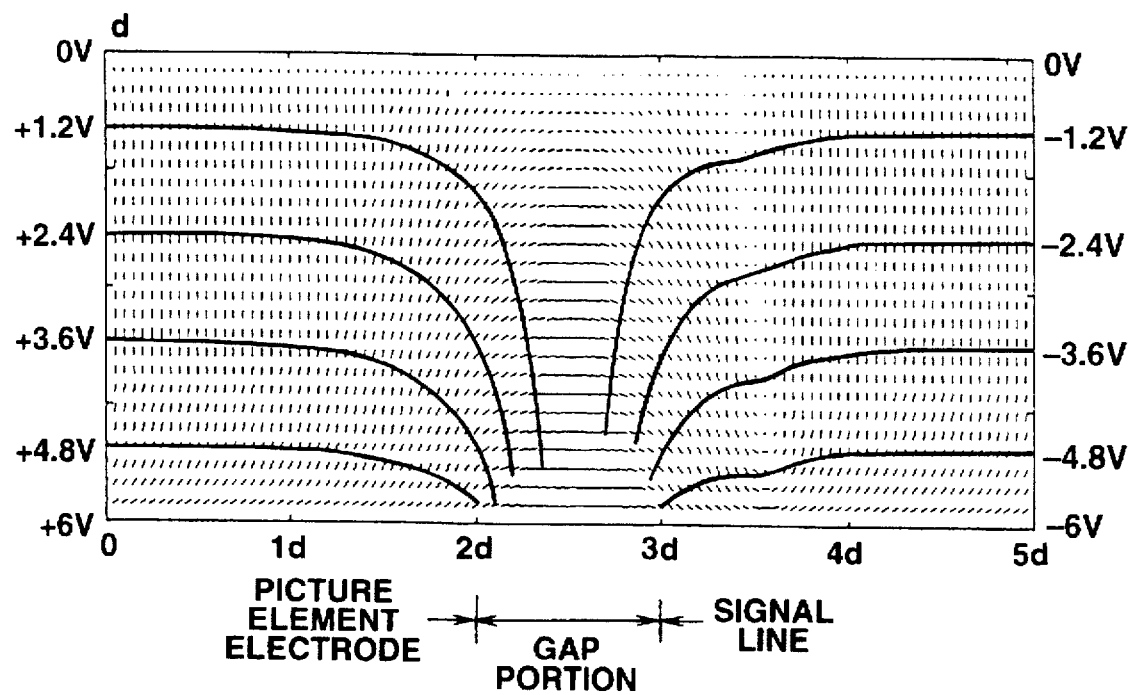
FIG. 11A is a view in which alignment vector and an equipotential curve, of liquid crystal in the alignment condition shown in FIG. 10, are overlapped.

An alignment condition obtained when the one shown in FIG. 8 is rotated by 45° in a clockwise direction, is shown in FIG. 10. The alignment treatment on the lower alignment layer 41 was carried out in a direction toward the right, as illustrated by a dotted line with an arrow in FIG. 10, and the alignment treatment on the upper alignment layer 45 was carried out in a direction toward the upper, as illustrated by a solid line with an arrow in this figure. Other conditions were the same as the case of using the alignment condition shown in FIG. 3, so that the results shown in FIGS. 11A and 11B were obtained. According to FIG. 11B, it is understood that a peak of optical leakage according to the disclination is formed in the right side of the gap portion, the transmission distance of optical leakage in the side of the peak is about 0.7d and the Y-value at the peak is about 8. On the other hand, the transmission distance of optical leakage in the side opposite to the peak is about 0.5d and the Y-value is about 5.

Figure 5B:
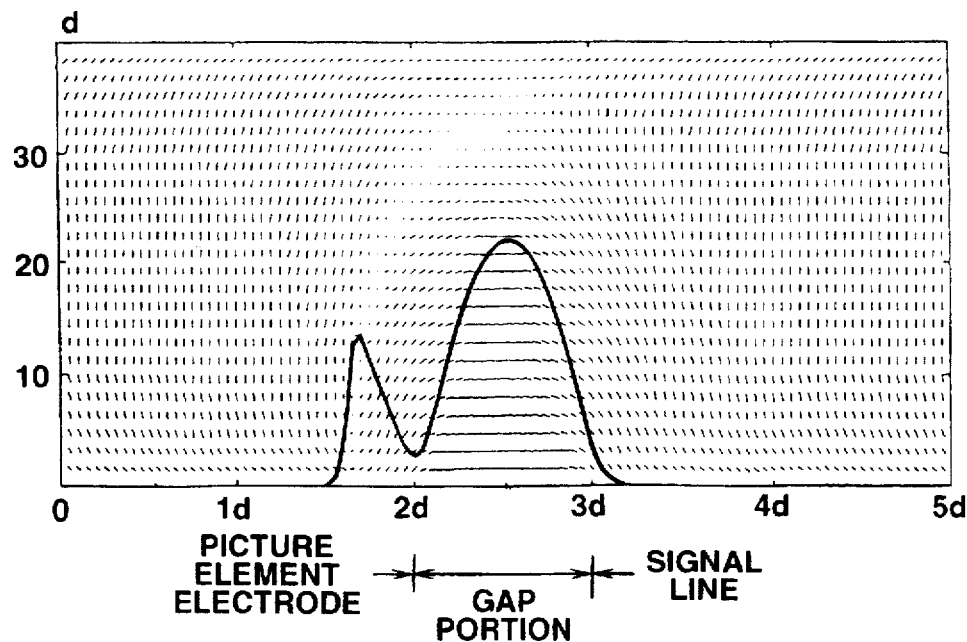
FIG. 5B is a view in which alignment vector and Y-value, of liquid crystal in the same alignment condition as that of FIG. 5A, are overlapped.
Figure 12A:
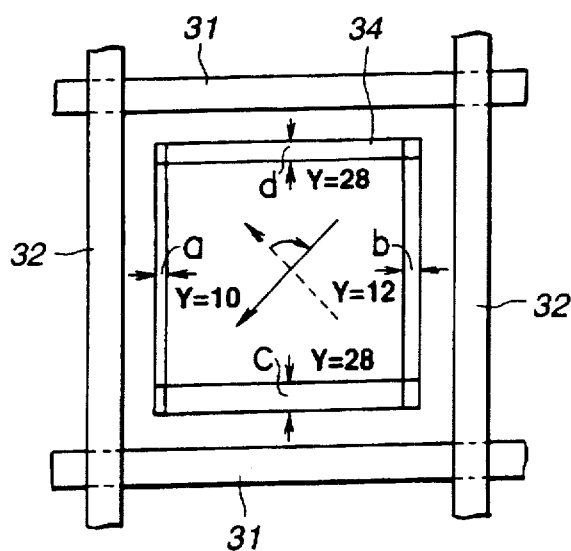
FIG. 12A is a view for explaining the occurrence position of disclination in the alignment condition shown in FIG. 3.
Figure 13A:
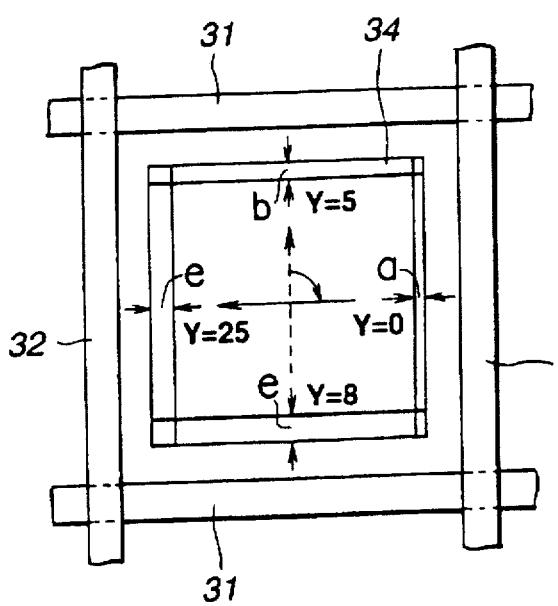
FIG. 13A is a view for explaining the occurrence position of disclination in the alignment condition shown in FIG. 6.

The relationship between the alignment treatment direction of the alignment layers 41 and 45 and the occurrence position of disclination in the alignment conditions shown in FIGS. 3 and 6, are shown in FIGS. 12A and 13A, respectively. First, the relationship in the case of the alignment condition shown in FIG. 3 will be explained. Because the transmission distance of optical leakage in the side of the peak is dimension "b" (about 0.5d) and the Y-value at the peak is about 12, on the other hand, the transmission distance of optical leakage in the side opposite to the peak is dimension "a" (about 0.3d) and the Y-value at the edge of the signal line is about 10, as shown in FIG. 5B, an optical leakage having a Y-value of about 12 occurs in a region inside the picture element electrode 34 and about 0.5d apart from the right edge thereof, and an optical leakage having a Y-value of about 10 occurs in a region inside the picture element electrode 34 and about 0.3d apart from the left edge thereof.

Figure 9B:
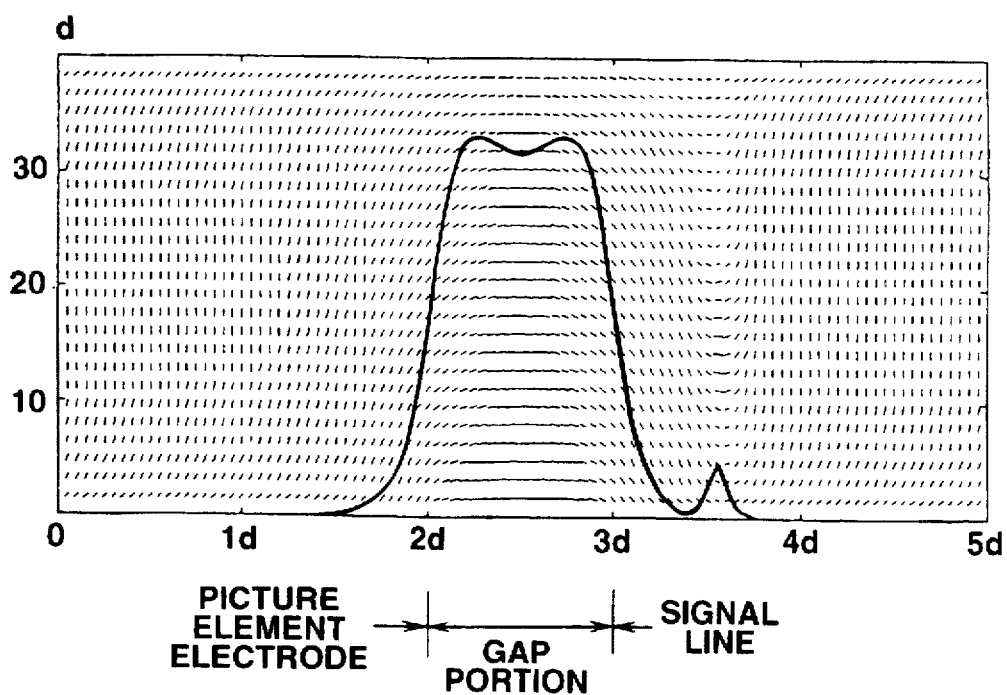
FIG. 9B is a view in which alignment vector and Y-value, of liquid crystal in the same alignment condition as that of FIG. 9A, are overlapped.

When rotating the alignment condition shown in FIG. 3 by 90° in a clockwise direction, an alignment condition shown in FIG. 8 is obtained. Therefore, the occurrence position of disclination in the right and left directions in the alignment conditions shown in FIG. 8 can be considered to be the occurrence position of disclination in the upper and lower directions in the alignment conditions shown in FIG. 3. Because the transmission distance of optical leakage in the side of the peak is dimension "c" (about 0.8d) and the Y-value at the peak is about 28, on the other hand, the transmission distance of optical leakage in the side opposite to the peak is about 0.6d and the Y-value at the edge of the picture element electrode is about 28, as shown in FIG. 9B, an optical leakage having a Y-value of about 28 occurs in a region inside the picture element electrode 34 and about 0.8d apart from the lower edge thereof, and an optical leakage having a Y-value of about 28 occurs in a region inside the picture element electrode 34 and dimension "a" (about 0.6d) apart from the upper edge thereof, as shown in FIG. 12A.

Figure 12B:
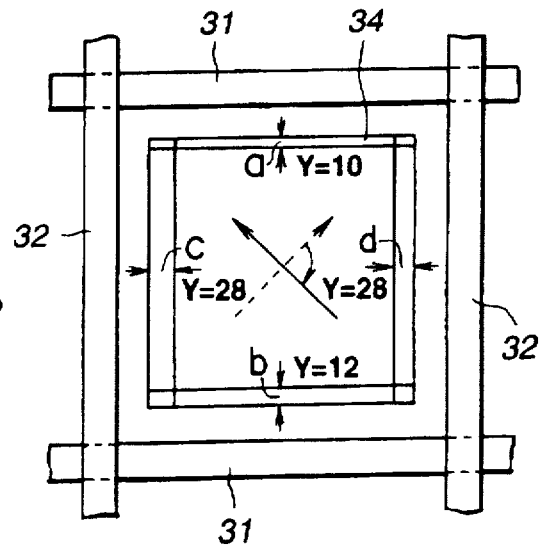
FIGS. 12B–12D are views for explaining the occurrence positions of disclination in respective alignment conditions when the alignment condition shown in FIG. 12A is rotated by 90°, 180°, and 270°, in a clockwise direction, respectively.
Figure 12C:
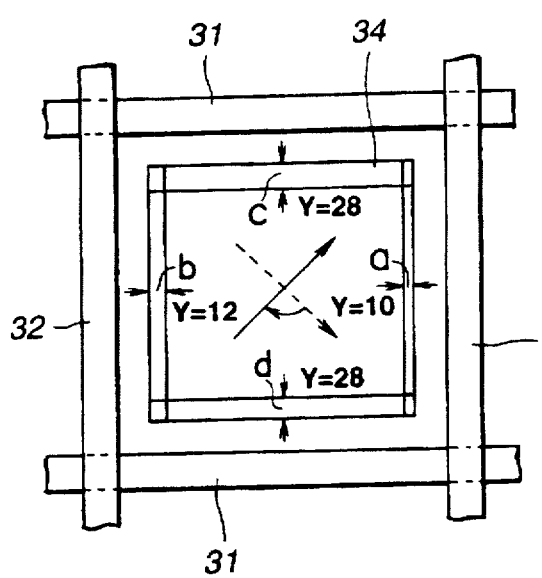

Because the alignment condition shown in FIG. 8 corresponds to the one obtained by rotating the one shown in FIG. 3 by 90° in a clockwise direction, the optical leakage condition according to the alignment condition is the one obtained by rotating the one shown in FIG. 12A by 90° in a clockwise direction, i.e., the one shown in FIG. 12B. The optical leakage condition according to an alignment condition obtained by rotating the one shown in FIG. 8 by 90° in a clockwise direction, is the one shown in FIG. 12C. The optical leakage condition according to an alignment condition obtained by a further 90° rotation in a clockwise direction, is the one shown in FIG. 12D.

Figure 7B:
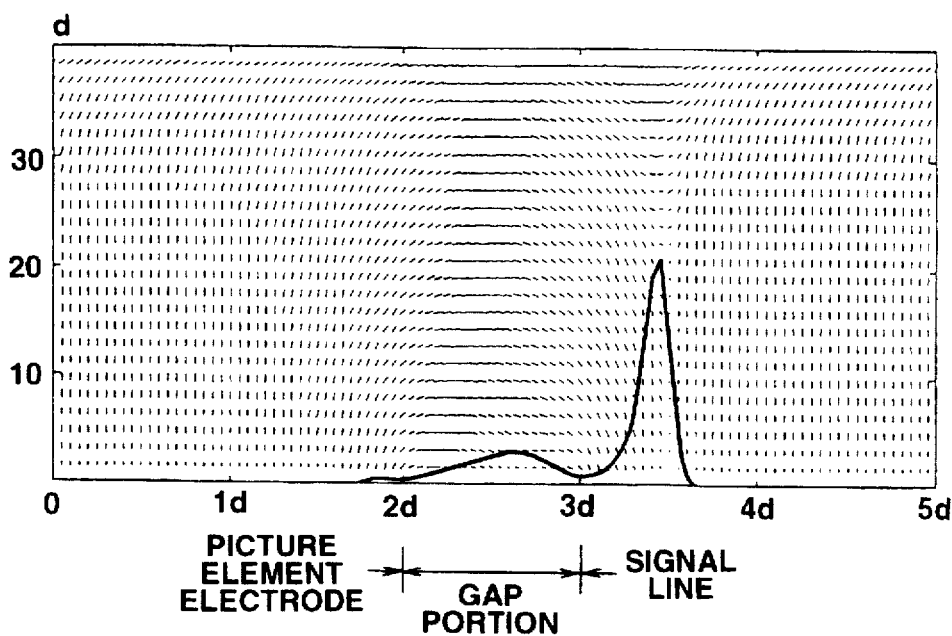
FIG. 7B is a view in which alignment vector and Y-value, of liquid crystal in the same alignment condition as that of FIG. 7A, are overlapped.

The relationship between the alignment treatment direction of the alignment layers and the occurrence position of disclination in the case of the alignment condition shown in FIG. 6 will be explained. Because the transmission distance of optical leakage in the side of the peak is about 0.7d and the Y-value at the peak is about 25, on the other hand, the transmission distance of optical leakage in the side opposite to the peak is about 0.3d and the Y-value is about 0, as shown in FIG. 7B, an optical leakage having a Y-value of about 25 occurs in a region inside the picture element electrode 34 and about 0.7d apart from the left edge thereof, and an optical leakage having a Y-value of about 0 occurs in a region inside the picture element electrode 34 and about 0.3d apart from the right edge thereof, as shown in FIG. 13A, wherein dimension "e" is about 0.7d.

Figure 11B:
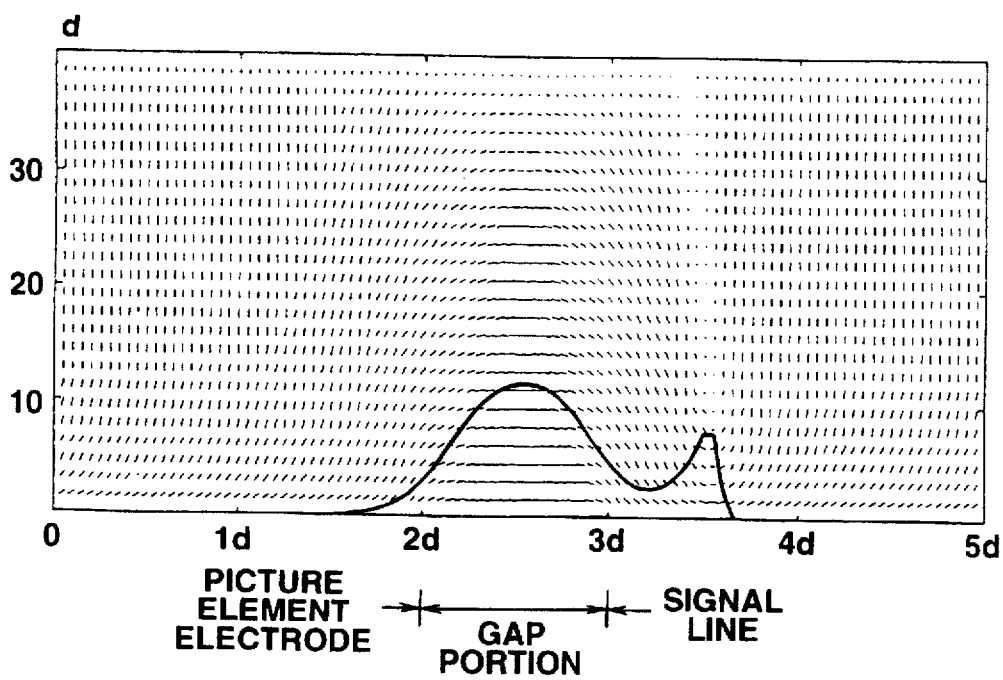
FIG. 11B is a view in which alignment vector and Y-value, of liquid crystal in the same alignment condition as that of FIG. 11A, are overlapped.

When rotating the alignment condition shown in FIG. 6 by 90° in a clockwise direction, an alignment condition shown in FIG. 10 is obtained. Therefore, the occurrence position of disclination in the right and left directions in the alignment conditions shown in FIG. 10 can be considered to be the occurrence position of disclination in the upper and lower directions in the alignment conditions shown in FIG. 6. Because the transmission distance of optical leakage in the side of the peak is about 0.7d and the Y-value at the peak is about 8, on the other hand, the transmission distance of optical leakage in the side opposite to the peak is about 0.5d and the Y-value at the edge of the picture element electrode is about 5, as shown in FIG. 11B, an optical leakage having a Y-value of about 8 occurs in a region inside the picture element electrode 34 and about 0.7d apart from the lower edge thereof, and an optical leakage having a Y-value of about 5 occurs in a region inside the picture element electrode 34 and about 0.5d apart from the upper edge thereof, as shown in FIG. 13A.

Figure 13B:
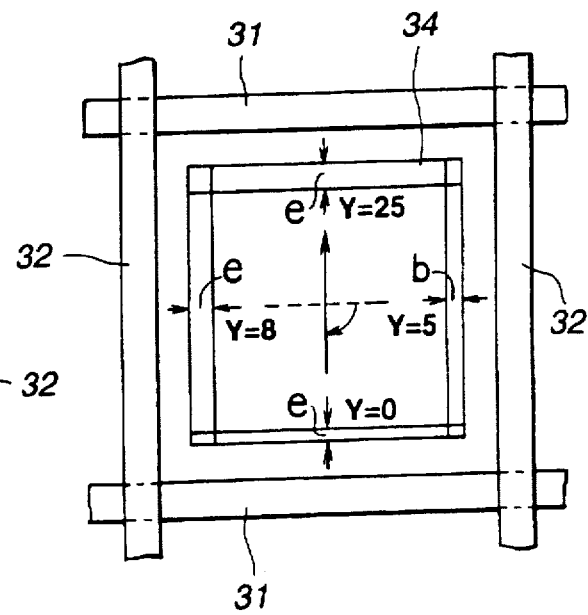
FIGS. 13B–13D are views for explaining the occurrence positions of disclination in respective alignment conditions when the alignment condition shown in FIG. 13A is rotated by 90°, 180°, and 270°, in a clockwise direction, respectively.

Because the alignment condition shown in FIG. 10 corresponds to the one obtained by rotating the one shown in FIG. 6 by 90° in a clockwise direction, the optical leakage condition according to the alignment condition is the one obtained by rotating the one shown in FIG. 13A by 90° in a clockwise direction, i.e., the one shown in FIG. 13B. The optical leakage condition according to an alignment condition obtained by rotating the one shown in FIG. 10 by 90° in a clockwise direction, is the one shown in FIG. 13C. The optical leakage condition according to an alignment condition obtained by a further 90° rotation in a clockwise direction, is the one shown in FIG. 13D.

As described above, the occurrence positions of disclination in the 8 alignment conditions shown in FIGS. 12 and 13 are different from one another. Therefore, for example, in the alignment condition shown in FIG. 12A, when the distance between the left edge 42b of the opening 42a of the light shading film 42 and the left edge of the picture element electrode 34 is 0.3d, the distance between the right edge 42b of the opening 42a of the light shading film 42 and the right edge of the picture element electrode 34 is 0.5d, the distance between the lower edge 42b of the opening 42a of the light shading film 42 and the lower edge of the picture element electrode 34 is 0.8d, and the distance between the upper edge 42b of the opening 42a of the light shading film 42 and the upper edge of the picture element electrode 34 is 0.6d, it is possible not only to reduce optical leakage according to disclination but also to make the aperture ratio as large as possible.

In the cases of the alignment conditions shown in FIGS. 12A–12D, the difference between the maximum and minimum values of the transmission distance of optical leakage is 0.5d, and in the cases of the alignment conditions shown in FIGS. 13A–13D, the difference between the maximum and minimum values of the transmission distance of optical leakage is 0.4d. Therefore, it is preferable to set such a difference not less than 0.4d.

In connection with FIGS. 12A–12D and FIGS. 13A–13D, i.e., the plan views showing occurrence conditions of optical leakage according to disclination, it is not necessarily required that the positions of the opening edges of the light shading film 42 with respect to the corresponding edges of the picture element electrode 34 are different to one another.

As known from observation of FIGS. 12A–12D, the transmission distance of optical leakage and the Y-value in the opposite sides to each other, of the picture element electrode 34, are mutually approximate. Therefore, the distances between the opposite opening edges of the light shading film 42 and the corresponding edges of the picture element electrode 34 may be approximately the same. The distances between the opposite opening edges of the light shading film 42 having larger Y-values and the corresponding edges of the picture element electrode 34, may be different from each other, e.g., about 0.6d and about 0.8d, respectively, and the distance between the positions of the opening edges in opposite sides having smaller Y-values and the corresponding edges of the picture element electrode 34 may be the same, e.g., about a value in the range of 0.3d–0.5d.

As known from observation of FIGS. 13A–13D, the transmission distances of optical leakage in adjacent sides are large and those of other adjacent sides are small, and the Y-value in only one side is large and those of other three sides are small. Therefore, the positions of the opening edges may be set so that the distances between the opening edges in adjacent sides of the picture element electrode having larger transmission distances of optical leakage and the corresponding edges of the picture element electrode 34 are the same, and the distances between the opening edges in the rest of adjacent sides and the corresponding edges of the picture element electrode 34 are smaller. The positions of the opening edges may be also set so that the distance between the opening edge in the side of the picture element electrode, which has a large transmission distance of optical leakage and a large Y-value, and the corresponding edge of the picture element electrode 34 is larger, and the distances between the rest of the opening edges and the corresponding edges of the picture element electrode 34 are smaller and the same.

Figure 12D:
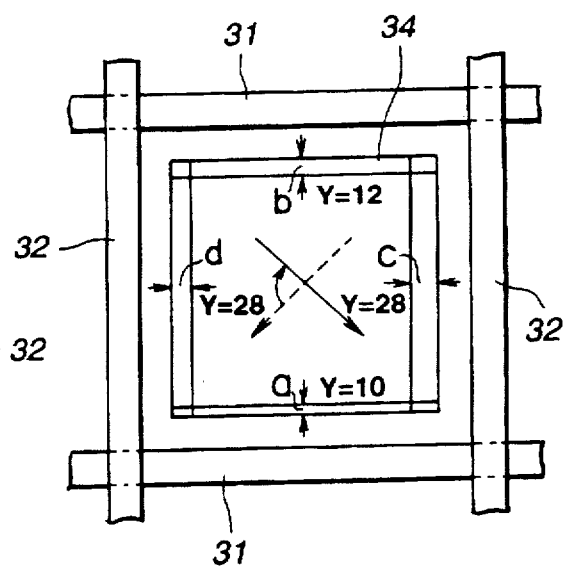
Figure 13C:
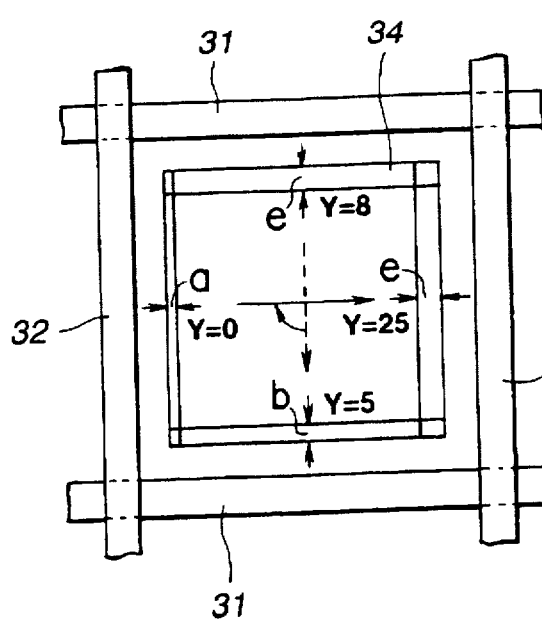
Figure 13D:
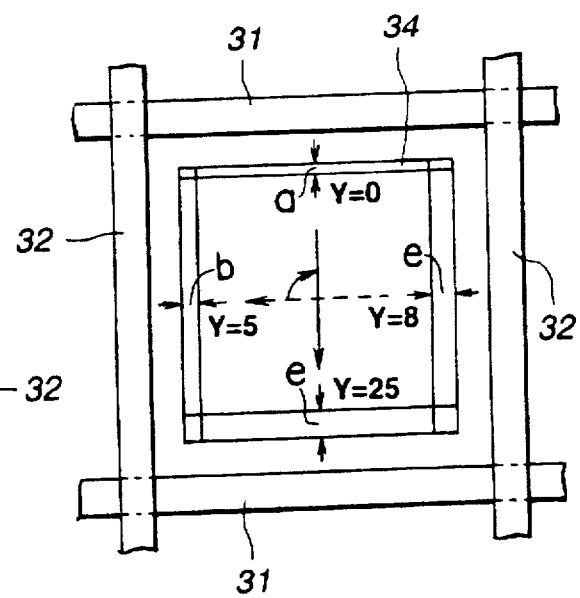

In an actual drive, even if the alignment directions of the alignment layers 41 and 45 are oblique, parallel, or perpendicular to the scanning line 31, because the voltage applied to the scanning line 31 is higher than that applied to the signal line 32, the potential difference between the scanning line 31 and the picture element electrode 34 is considerably larger than the potential difference between the signal line 32 and the picture element electrode 34. In order to reduce the optical leakage according to disclination considerably, it is preferable that the side having a smaller optical leakage according to disclination is the side of the scanning line 31, and the side having a larger optical leakage is the side of the signal line 32. Therefore, in FIGS. 12A–12D, the alignment conditions shown in FIGS. 12B and 12D are preferable to those shown in FIGS. 12A and 12C. In FIGS. 13A–13D, the alignment conditions shown in FIGS. 13A and 13C are slightly preferable to those shown in FIGS. 13B and 13D.

On the other hand, when an earthed potential or the electrode 35 for storage capacitor (the left drawn portion 35b and the right drawn portion 35c) which has the same potential as that of the common electrode 44, exists between the picture element electrode 34 and the signal line 32, the existing electrode 35 for storage capacitor functions as a shield electrode for alleviating the lateral electric field at the position. The same matter is caused also when an electrode 35 for storage capacitor exists between the picture element electrode 34 and the scanning line 31. As explained above, the alignment conditions shown in FIGS. 12B and 12D, or shown in FIGS. 13A and 13C are preferable. In these arrangement conditions, when a region in which the electrode 35 for storage capacitor overlaps with an edge of the picture element electrode 34 along only 2 adjacent edges or only 3 adjacent edges, which include an edge of the picture element electrode 34 on which the maximum optical leakage due to disclination is occurred, and a region in which the electrode 35 is outside an edge of the picture element electrode 34, are disposed, it is possible to make the aperture ratio larger, with a small optical leakage due to disclination.

Figure 14:
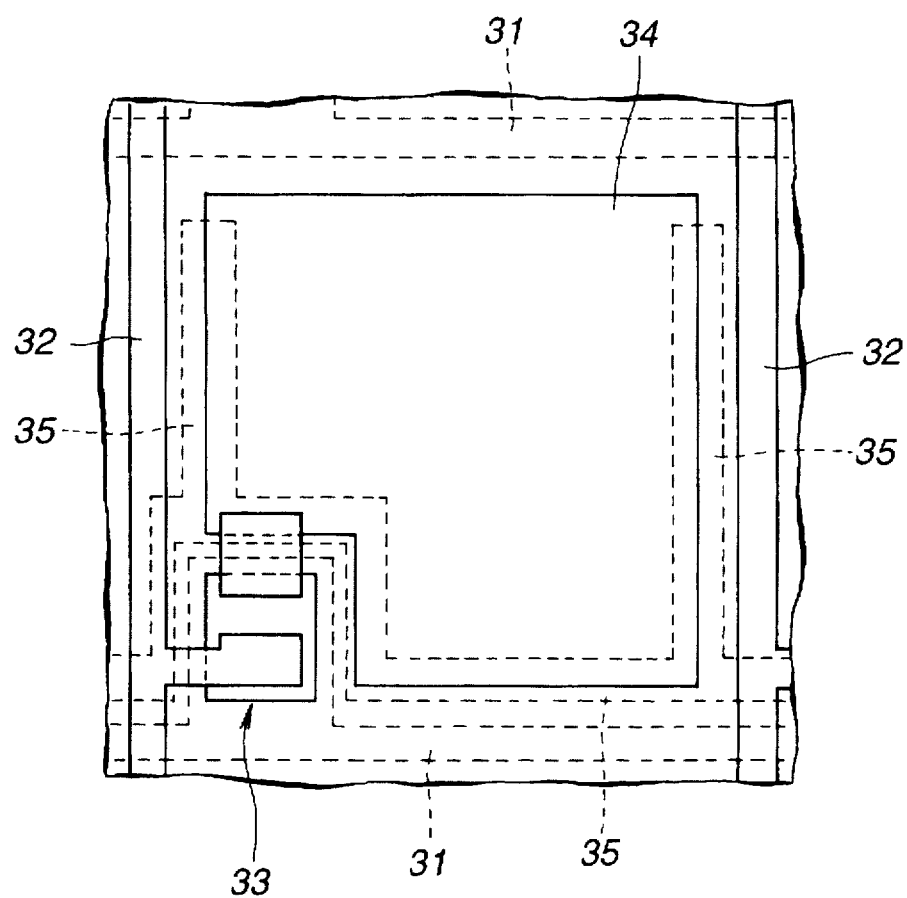
FIG. 14 is a view illustrating an arrangement condition of the electrode for the storage capacitor in the alignment condition shown in FIG. 12B.
Figure 15:
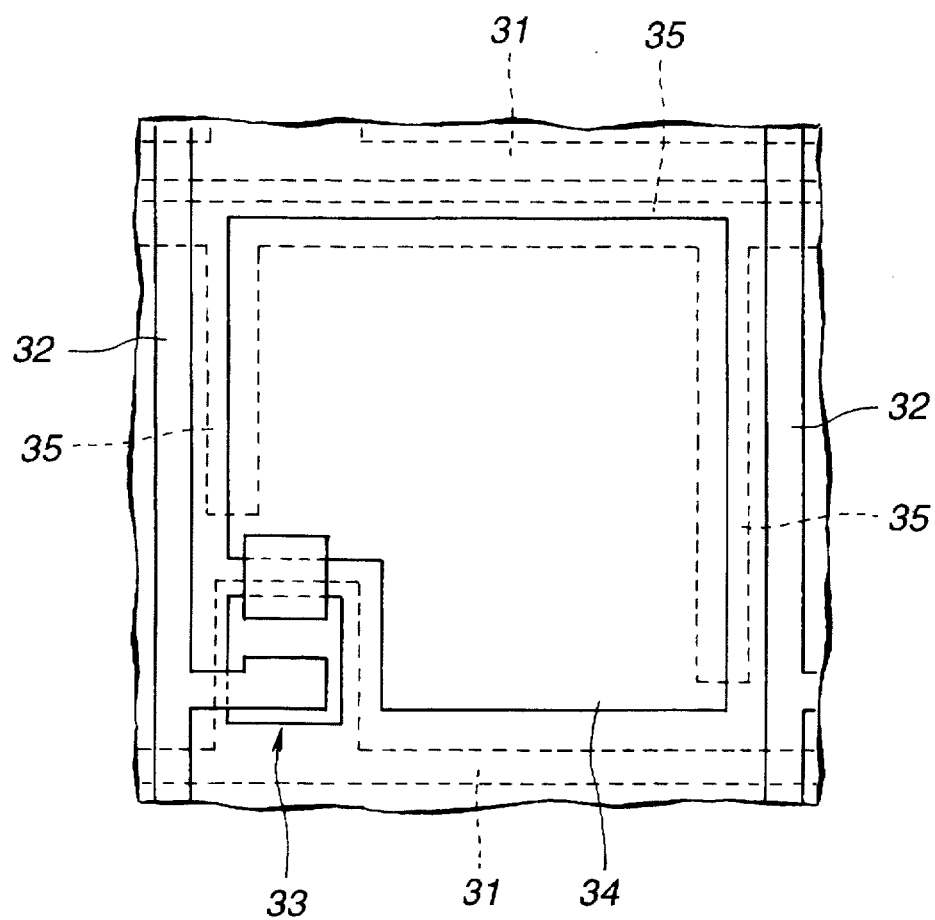
FIG. 15 is a view illustrating an arrangement condition of the electrode for the storage capacitor in the alignment condition shown in FIG. 12D.
Figure 16:
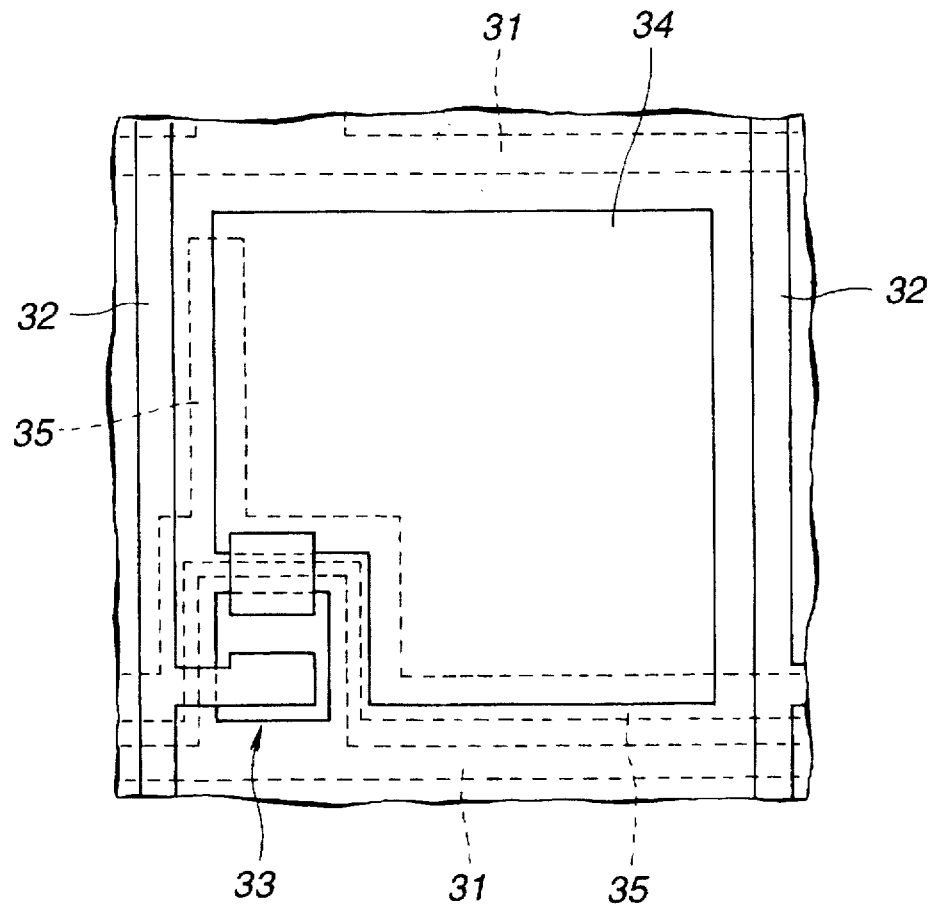
FIG. 16 is a view illustrating an arrangement condition of the electrode for the storage capacitor in the alignment condition shown in FIG. 13A.
Figure 17:
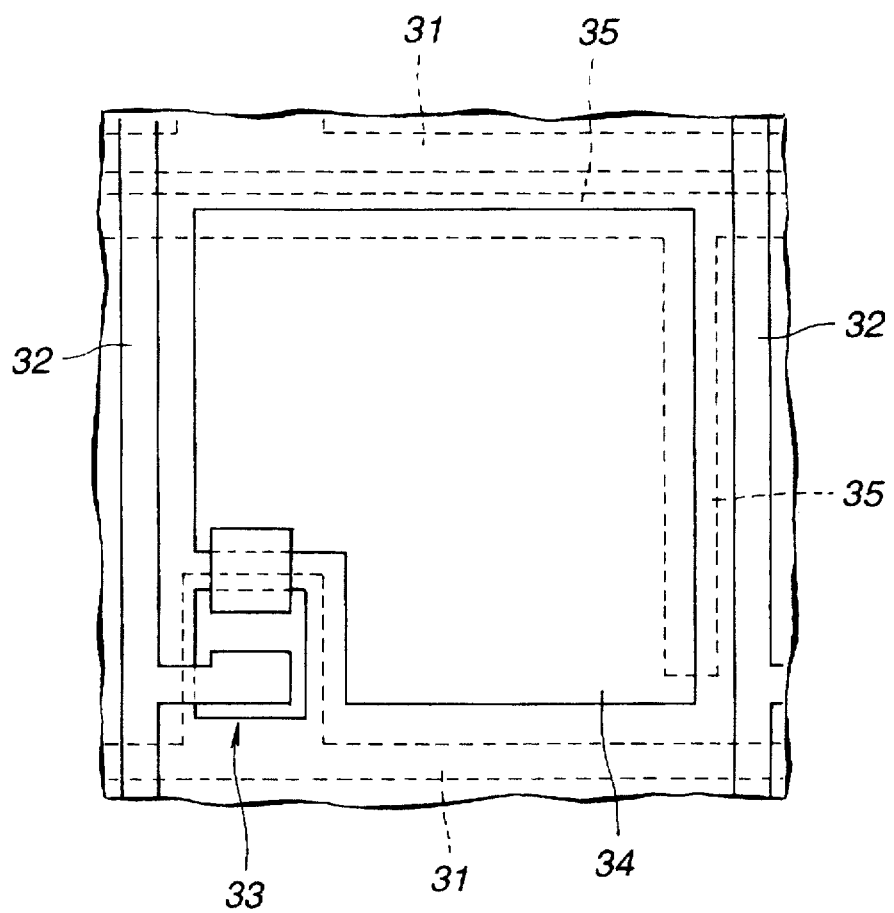
FIG. 17 is a view illustrating an arrangement condition of the electrode for the storage capacitor in the alignment condition shown in FIG. 13C.

That is, because the optical leakage in the side of the upper edge of the picture element electrode 34 is the minimum when the alignment treatment direction on the lower alignment layer 41 is toward the upper right, as shown by a dotted line with an arrow in FIG. 12B, the electrode 35 for storage capacitor is disposed in the sides of the left edge, of the right edge and of the lower edge of the picture element electrode 34, as shown in FIG. 14. Because the optical leakage in the side of the lower edge of the picture element electrode 34 is the minimum when the alignment treatment direction on the lower alignment layer 41 is toward the lower left, as shown by a dotted line with an arrow in FIG. 12D, the electrode 35 for storage capacitor is disposed in the sides of the left edge, of the right edge and of the upper edge of the picture element electrode 34, as shown in FIG. 15. Because the optical leakage in the side of the lower edge of the picture element electrode 34 is small when the alignment treatment direction on the lower alignment layer 41 is toward the upper, as shown by a dotted line with an arrow in FIG. 13A, the electrode 35 for storage capacitor is disposed in the sides of the left edge and of the lower edge of the picture element electrode 34, as shown in FIG. 16. Because the optical leakage in the sides of the left and lower edges of the picture element electrode 34 is small when the alignment treatment direction on the lower alignment layer 41 is toward the lower, as shown by a dotted line with an arrow in FIG. 13C, the electrode 35 for storage capacitor is disposed in the sides of the right edge and of the upper edge of the picture element electrode 34, as shown in FIG. 17.

Figure 18A:
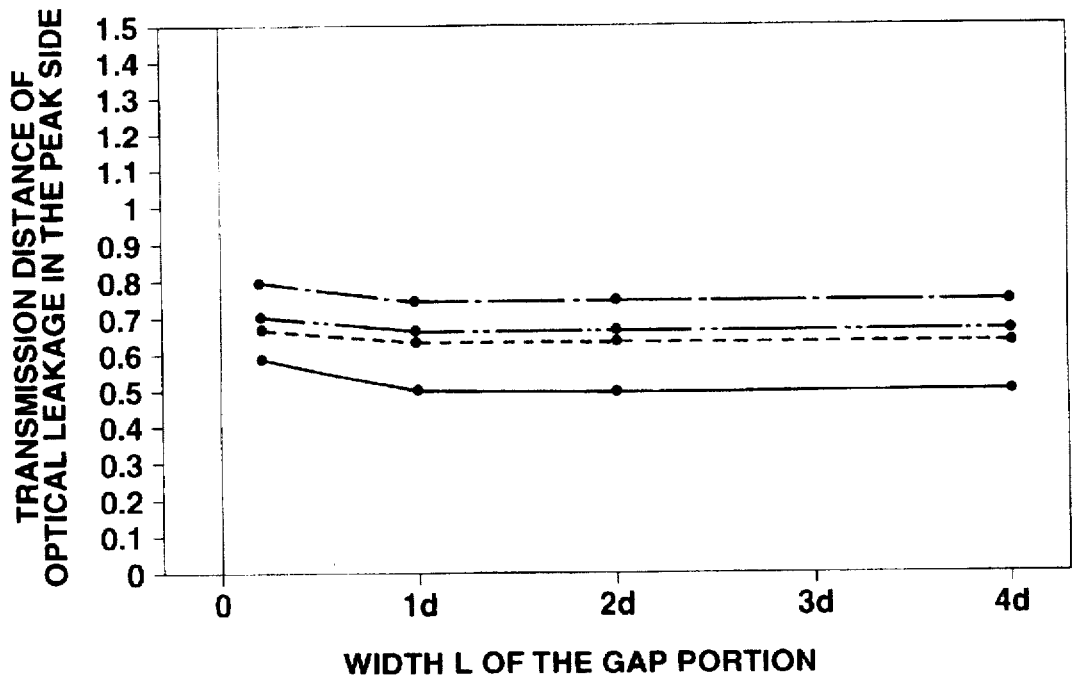
FIG. 18A is a view illustrating the relationship between the width L of the gap portion and the transmission distance of optical leakage in the peak side.
Figure 18B:
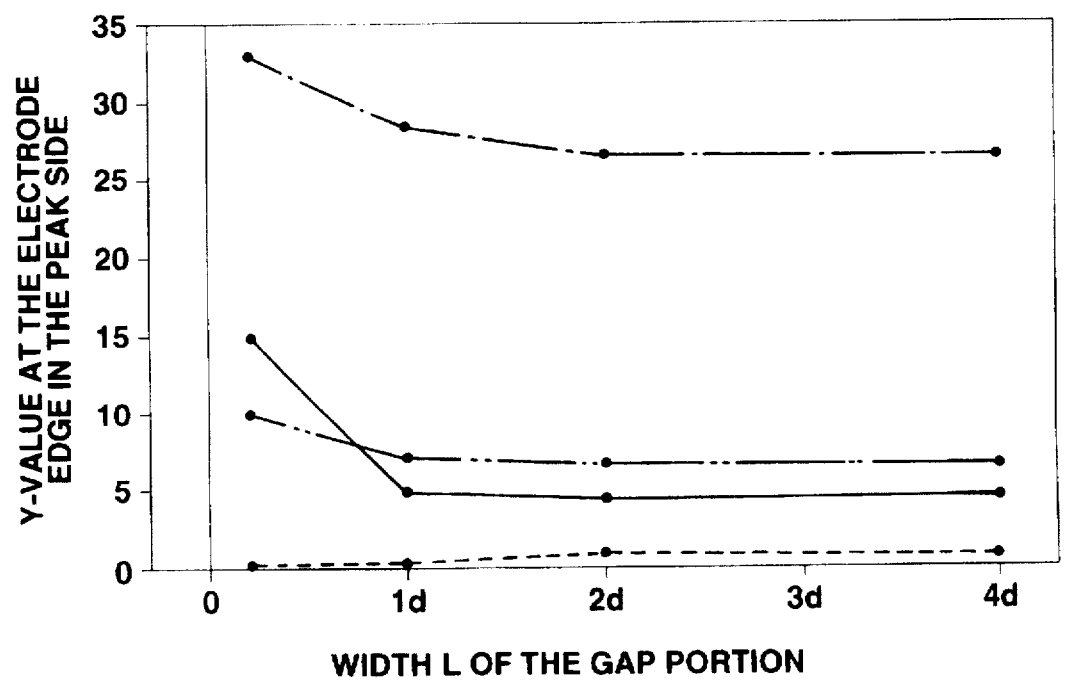
FIG. 18B is a view illustrating the relationship between the width L of the gap portion and Y-value at the electrode edge in the peak side.

Next, the dependency of disclination upon changeable width L of the gap portion was investigated. The results shown in FIGS. 18A and 18B were obtained. FIG. 18A illustrates the relationship between the width L of the gap portion and the transmission distance of optical leakage in the peak side. FIG. 18B illustrates the relationship between the width L of the gap portion and Y-value on the electrode edge in the peak side. In these figures, solid lines illustrate the relationship in the case of the alignment condition shown in FIG. 3, dotted lines illustrate the relationship in the case of the alignment condition shown in FIG. 6, alternate long and short dot lines illustrate the relationship in the case of the alignment condition shown in FIG. 8, and alternate long and two short dot lines illustrate the relationship in the case of the alignment condition shown in FIG. 10. According to FIG. 18A, it is understood that the transmission distance of optical leakage is smaller the larger the width L of the gap portion is, and that the transmission distance does not almost change when the width L is not less than 1d. The reason for this is that the lateral field is small as a matter of course when the distance between the picture element electrode 34 and the signal line 32, which have contrary signs to each other, are large. Therefore, preferably, the width L is not less than about 1d and is as small as possible.

For example, because the optical leakage due to disclination in the side of the left edge of the picture element electrode 34 is larger than that in the side of the right edge when the alignment treatment direction is as shown in FIG. 12B, even if the gap between the right edge of the picture element electrode 34 and the right signal line 32 is smaller than the gap between the left edge of the picture element electrode 34 and the left signal line 32, the optical leakage due to disclination in the right side can be the same as or smaller than that in the left side.

The same matter can be also applied in the alignment conditions shown in FIGS. 12B and 12D, or 13A and 13C. For example, when the gap d between both the alignment layers is 5 μm, in the alignment condition shown in FIG. 12B, the gap between the left edge of the picture element electrode 34 and the left signal line 32 may be 5 μm, and the gap between the right edge of the picture element electrode 34 and the right signal line 32 may be 3 μm. In the alignment condition shown in FIG. 12D, the gap between the right edge of the picture element electrode 34 and the right signal line 32 may be 5 μm, and the gap between the left edge of the picture element electrode 34 and the left signal line 32 may be 3 μm. In the alignment condition shown in FIG. 13A, the gap between the left edge of the picture element electrode 34 and the left signal line 32 may be 5 μm, and the gap between the right edge of the picture element electrode 34 and the right signal line 32 may be 3 μm. In the alignment condition shown in FIG. 13C, the gap between the right edge of the picture element electrode 34 and the right signal line 32 may be 5 μm, and the gap between the left edge of the picture element electrode 34 and the left signal line 32 may be 3 μm.

As described above, when the gap between the edge of the picture element electrode 34 and the signal line 32 or the scanning line 31, in the side of a large optical leakage depending on the Y-value and the transmission distance due to disclination, is large, and when that in the side of a small optical leakage is small, to substantially equalize the optical leakage which appear on the edges of the picture element electrode 34, it is possible to make the distance between each opening edge of the light shading film 41 and the corresponding edge of the picture element electrode 34 uniform. Further, because the width of the light shading film 41 can be uniform, it is possible to obtain a uniform and clear display.

Figure 19A:
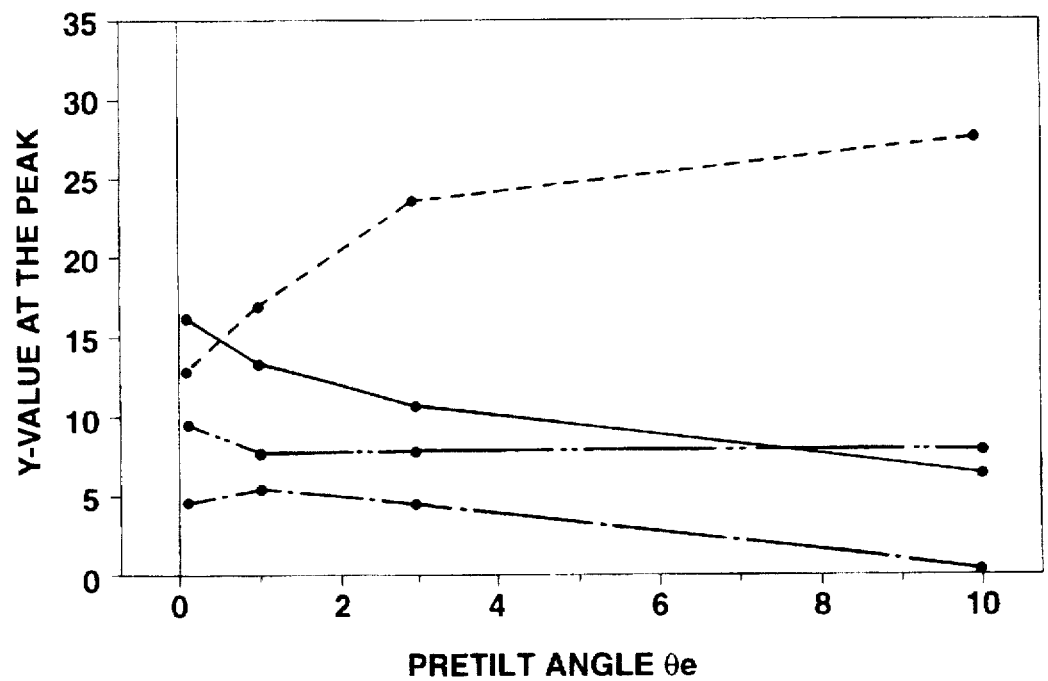
FIG. 19A is a view illustrating the relationship between pretilt angle $\Theta e$ and Y-value at the peak.
Figure 19B:
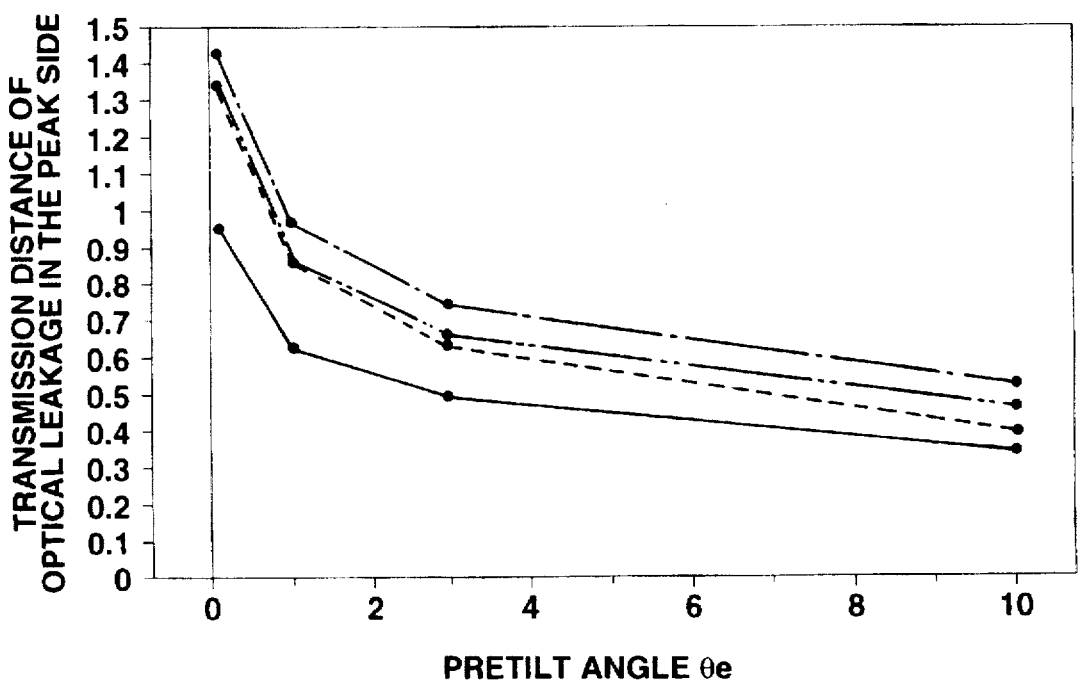
FIG. 19B is a view illustrating the relationship between pretilt angle $\Theta e$ and the transmission distance of optical leakage in the peak side.
Figure 20A:
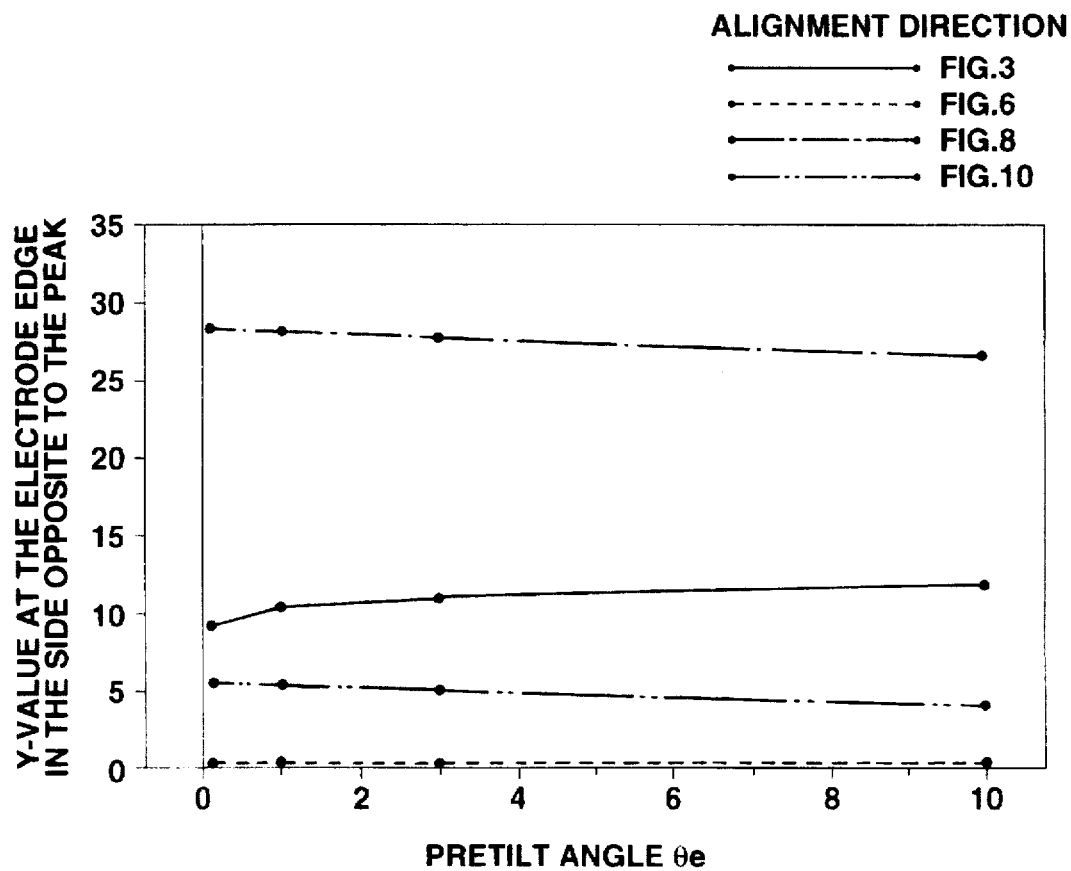
FIG. 20A is a view illustrating the relationship between pretilt angle $\Theta e$ and Y-value at the electrode edge in the side opposite to the peak.
Figure 20B:
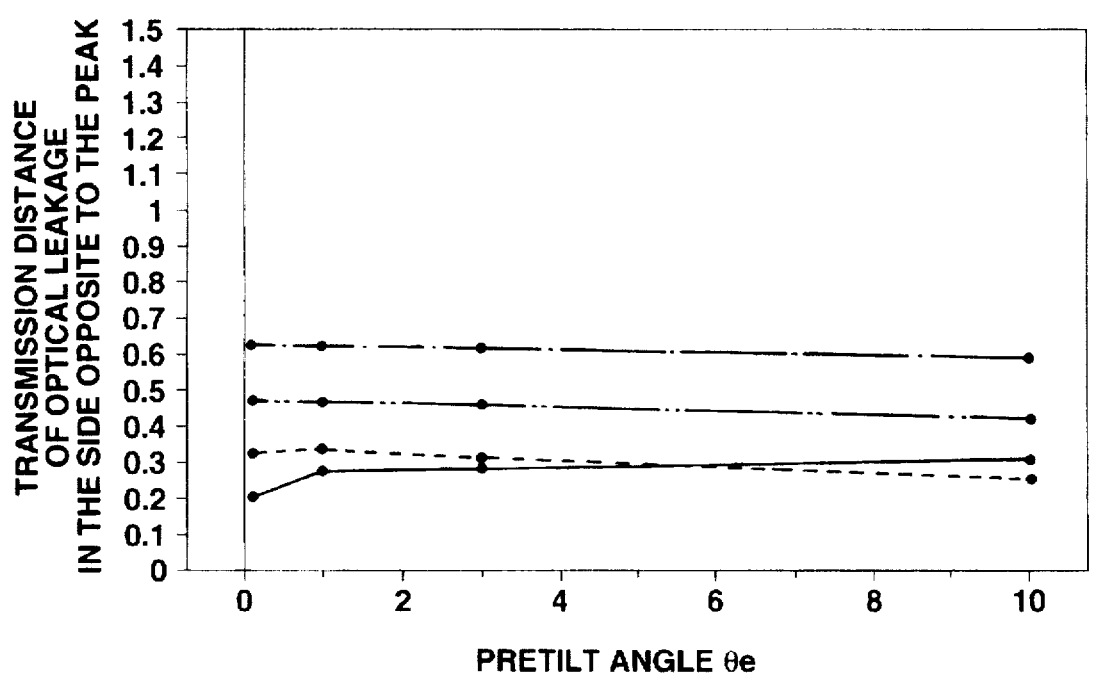
FIG. 20B is a view illustrating the relationship between pretilt angle $\Theta e$ and the transmission distance of optical leakage in the side opposite to the peak.

Next, the dependency of disclination upon changeable pretilt angle Θe was investigated. The results shown in FIGS. 19A–19B and 20A–20B were obtained. FIG. 19A illustrates the relationship between pretilt angle Θe and Y-value at the peak. FIG. 19B illustrates the relationship between pretilt angle Θe and the transmission distance of optical leakage in the peak side. FIG. 20A illustrates the relationship between pretilt angle Θe and Y-value at the electrode edge in the side opposite to the peak. FIG. 20B illustrates the relationship between pretilt angle Θe and the transmission distance of optical leakage in the side opposite to the peak. In these figures, solid lines illustrate the relationship in the case of the alignment condition shown in FIG. 3, dotted lines illustrate the relationship in the case of the alignment condition shown in FIG. 6, alternate long and short dot lines illustrate the relationship in the case of the alignment condition shown in FIG. 8, and alternate long and two short dot lines illustrate the relationship in the case of the alignment condition shown in FIG. 10. According to FIG. 19B, it is understood that the transmission distance of optical leakage in the peak side is smaller the larger the pretilt angle Θe is. In particular, it is understood that use of an alignment layer of high pretilt which gives a pretilt angle Θe not less than 5°, improves optical leakage due to disclination. However, the present invention is not limited to the display with a high pretilt alignment, and has advantageous effects even in a display with an ordinary pretilt angle of about 3°.

Figure 21:
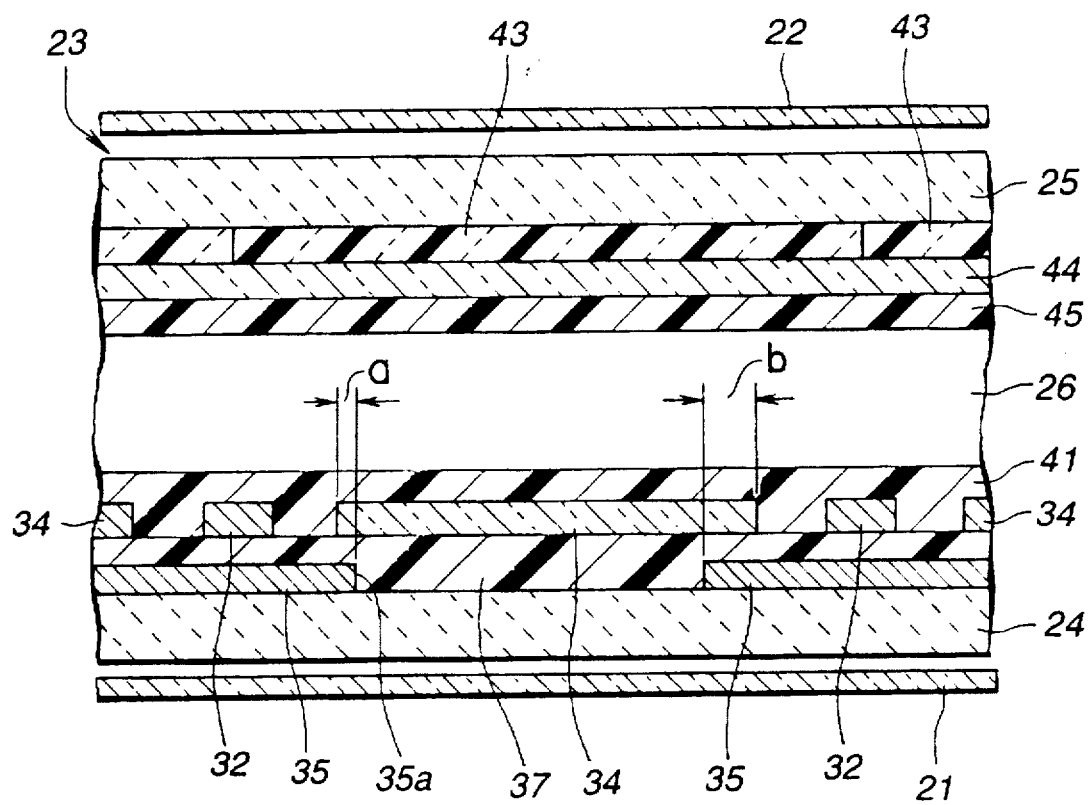
FIG. 21 is a cross sectional view showing the principal part of an active-matrix type liquid crystal display device according to another embodiment of the present invention.
Figure 22:
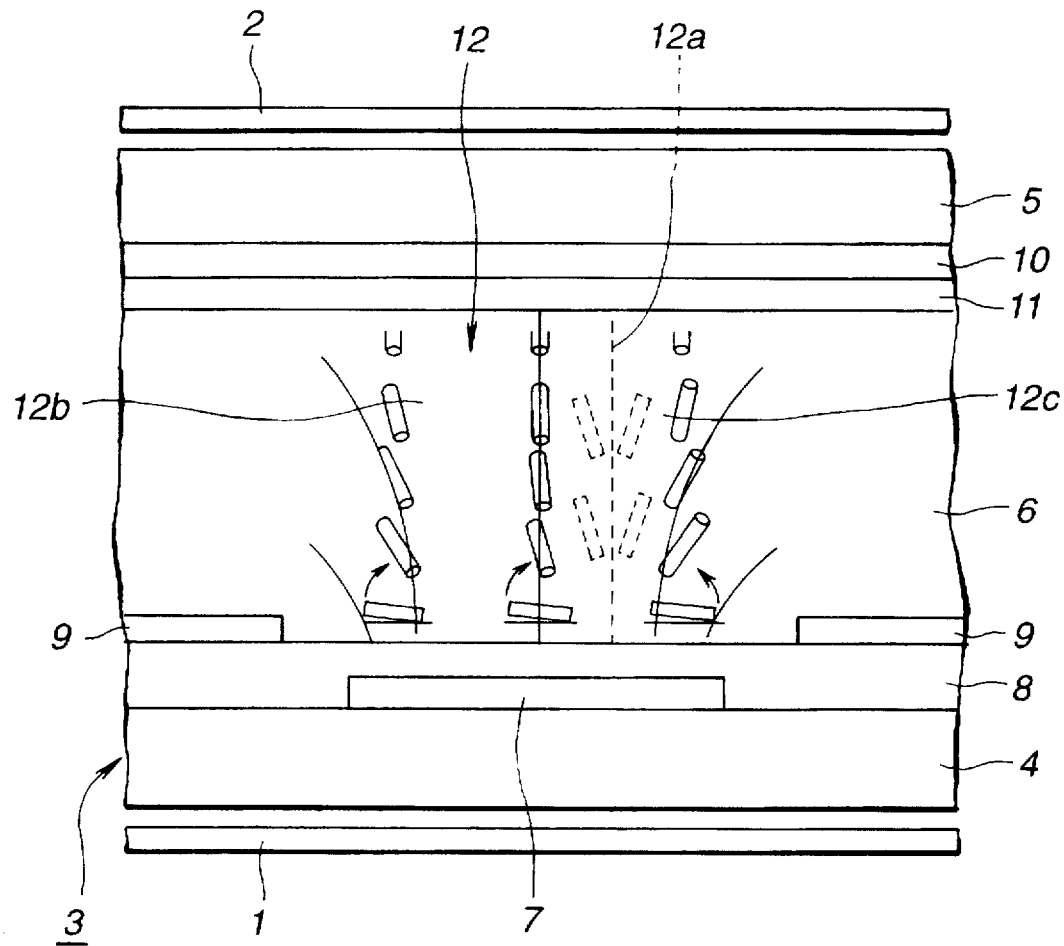
FIG. 22 is a cross sectional view showing a portion of a conventional active-matrix type liquid crystal display device.
Figure 23:
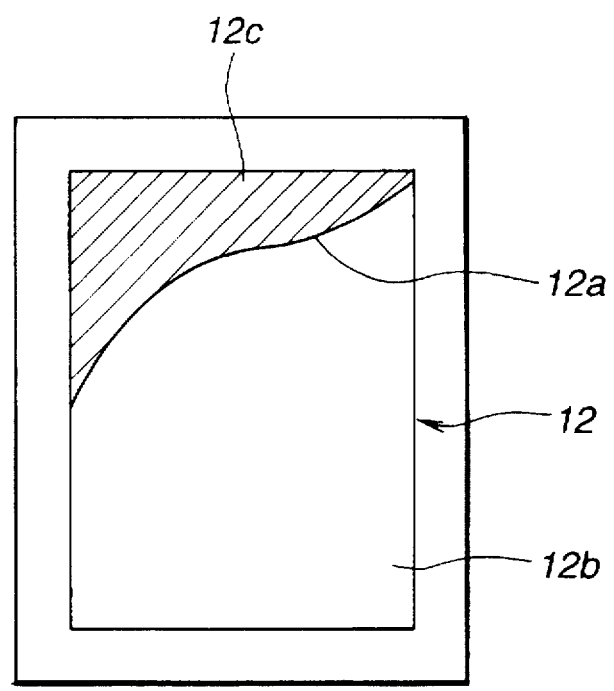
FIG. 23 is a plan view showing a state of disclination occurred in a picture element.

FIG. 21 shows the principal part of the matrix type liquid crystal display device according to another embodiment of the present invention. In this figure, the same reference symbols are attached to structural members, elements or the like corresponding to those of FIG. 2, and a duplicate detailed explanation for such structures is omitted.

In this embodiment, the upper substrate 25 has no light shading film thereon and has only a color filter 43. An electrode 35 for the storage capacitor which doubles as a light shading film are provided on the lower substrate 24. Therefore, the width of the electrode 35 for the storage capacitor is larger than the width L of the gap between the picture element electrodes 34. In this case, the electrode 35 for the storage capacitor has a frame-like shape surrounding the circumference of each picture element electrode 34, similar to the light shading film 42 shown in FIG. 1. For example, when the distance between the left edge of the opening 35a of the electrode 35 for the storage capacitor and the left edge of the picture element electrode 34 is dimension "a" (about 0.3d) and the distance between the right edge of the opening 35a of the electrode 35 for the storage capacitor and the right edge of the picture element electrode 34 is dimensions "b" (about 0.5d), it is possible not only to reduce optical leakage according to disclination but also to make the aperture ratio as large as possible.

In the case of providing the electrode 35 for the storage capacitor which functions as a light shading film on the lower substrate 24, it is preferable to dispose a light shading film on the channel of the thin film transistor. As a switching element, a non-linear element, e.g., a MIM (Metal-Insulator-Metal) or the like, may be used, instead of the thin film transistor. The alignment treatment directions of the lower and upper alignment layers 41 and 45 are not limited to the directions which cross at right angles. For example, alignment treatment directions which cross at an angle larger than 90° can be also utilized. Further, the present invention can be applied to not only a color LCD and a transmission type of LCD but also a black and white LCD, a reflection type of LCD and the like.

According to the present invention, because the distance between the edge of the opening of the light shading film and the signal line or the scanning line, in the side corresponding to an edge of the picture element electrode at which an optical leakage due to disclination of the liquid crystal appears larger, is larger than that of the side corresponding to an edge of the picture element electrode at which an optical leakage due to disclination of the liquid crystal appears smaller, it is possible not only to reduce optical leakage according to disclination but also to make the aperture ratio as large as possible.

What is claimed is:

1. A liquid crystal display device comprising:

a first substrate;

a second substrate;

a picture element electrode having an approximately square share, said picture element electrode being formed on the first substrate on a side of a surface of the first substrate opposed to the second substrate;

a pair of signal lines and a pair of scanning lines, said signal lines and said scanning lines being arranged at predetermined spaces apart from peripheral edges of the picture element electrode;

a first alignment layer on which an alignment treatment is applied in a first alignment direction, said first alignment layer covering the picture element electrode, the signal lines and the scanning lines;

a counter electrode formed on the second substrate on a side of a surface of the second substrate opposed to the first substrate;

a second alignment layer on which an alignment treatment is applied in a second alignment direction which is different from the first alignment layer, said second alignment layer covering the counter electrode;

a liquid crystal disposed between the first and second alignment layers; and a light shading film formed on one of the first substrate and the second substrate along one of the signal lines and the scanning lines, wherein: (i) the light shading film includes an opening with a size smaller than a size of the picture element electrode, (ii) an edge of the opening is situated inside an edge of the picture element electrode, and (iii) a distance between the edge of the opening and the one of the signal lines and the scanning lines along which the light shading film is formed, on a side corresponding to a side of the picture element electrode at which an optical leakage caused by disclination of the liquid crystal appears largest, is larger than a distance on a remaining three sides corresponding to a remaining three sides of the picture element electrode at which an optical leakage caused by disclination of the liquid crystal appears smaller.

2. A liquid crystal display device as claimed in claim 1, wherein the light shading film is formed on the second substrate.

3. A liquid crystal display device as claimed in claim 1, wherein the light shading film is formed on the first substrate.

4. A liquid crystal display device as claimed in claim 3, wherein an insulating film is provided between the light shading film and the picture element electrode, and the light shading film doubles as an electrode for a storage capacitor for storing auxiliary capacitance between the light shading film and the picture element electrode.

5. A liquid crystal display device as claimed in claim 1, wherein the approximately square shaped picture element electrode includes a first pair of opposed sides and a second pair of opposed sides, and each of said pair of signal lines is disposed along one of the first pair of opposed sides of the picture element electrode and each of said pair of scanning lines is disposed along one of the second pair of opposed sides of the picture element electrode.

6. A liquid crystal display device as claimed in claim 5, wherein the first and second alignment directions of the alignment treatments of said first and second alignment layers, respectively, are not parallel with an alignment direction of either of the signal lines and the scanning lines.

7. A liquid crystal display device as claimed in claim 6, wherein each of the respective alignment treatments of the first and second alignment layers is applied in a direction in which the optical leakage due to disclination is minimized on a side of the scanning lines.

8. A liquid crystal display device as claimed in claim 1, wherein a gap L between one of the picture element electrode and the signal lines, and the picture element electrode and the scanning lines, is not less than a distance d between the first and second alignment layers.

9. A liquid crystal display device as claimed in claim 1, wherein a pretilt angle of the liquid crystal is not less than 5°.

10. A liquid crystal display device comprising:

first substrate;

a second substrate;

a picture element electrode having an approximately square shape including a first pair of opposed sides and a second pair of opposed sides, said picture element electrode being formed on the first substrate on a side of a surface of the first substrate opposed to the second substrate;

a pair of signal lines and a pair of scanning lines, said signal lines and said scanning lines being arranged at predetermined spaces apart from peripheral edges of the picture element electrode, and each of said pair of signal lines being disposed along one of the first pair of opposed sides of the picture element electrode and each of said pair of scanning lines being disposed along one of the second pair of opposed sides of the picture element electrode;

a first alignment layer on which an alignment treatment is applied in a first alignment direction, said first alignment layer covering the picture element electrode, the signal lines and the scanning lines;

a counter electrode formed on the second substrate on a side of a surface of the second substrate opposed to the first substrate;

a second alignment layer on which an alignment treatment is applied in a second alignment direction which is different from the first alignment layer, said first and second alignment directions being parallel with an alignment direction of one of the signal lines and the scanning lines, and said second alignment layer covering the counter electrode;

a liquid crystal disposed between the first and second alignment layers; and a light shading film formed on one of the first substrate and the second substrate along one of the signal lines and the scanning lines, wherein: (i) the light shading film includes an opening with a size smaller than a size of the picture element electrode, (ii) an edge of the opening is situated inside an edge of the picture element electrode, and (iii) a distance between the edge of the opening and the one of the signal lines and the scanning lines along which the light shading film is formed, on a side corresponding to a side of the picture element electrode at which an optical leakage caused by disclination of the liquid crystal appears largest, is larger than a distance on a remaining three sides corresponding to a remaining three sides of the picture element electrode at which an optical leakage caused by disclination of the liquid crystal appears smaller.

11. A liquid crystal display device as claimed in claim 10, wherein each of the respective alignment treatments of the first and second alignment layers is applied in a direction in which the optical leakage due to disclination is maximized on a side of the signal lines.

* * * * *